United States Patent
Threewits

(10) Patent No.: US 9,870,134 B2
(45) Date of Patent: *Jan. 16, 2018

(54) INTERACTIVE BLOCKING AND MANAGEMENT FOR PERFORMING ARTS PRODUCTIONS

(71) Applicant: Randall Lee Threewits, Delray Beach, FL (US)

(72) Inventor: Randall Lee Threewits, Delray Beach, FL (US)

(*) Notice: Subject to any disclaimer, the term of this patent is extended or adjusted under 35 U.S.C. 154(b) by 164 days.

This patent is subject to a terminal disclaimer.

(21) Appl. No.: 14/840,624

(22) Filed: Aug. 31, 2015

(65) Prior Publication Data

US 2016/0077719 A1 Mar. 17, 2016

Related U.S. Application Data

(63) Continuation-in-part of application No. 13/826,503, filed on Mar. 14, 2013, now Pat. No. 9,122,656,
(Continued)

(51) Int. Cl.
*G10L 13/00* (2006.01)
*G10L 15/00* (2013.01)
(Continued)

(52) U.S. Cl.
CPC ........ *G06F 3/04845* (2013.01); *G06F 3/0481* (2013.01); *G06F 3/04842* (2013.01);
(Continued)

(58) Field of Classification Search
CPC ......... G10L 15/00; G10L 15/08; G10L 15/01; G10L 15/18; G10L 15/26; G10L 15/265;
(Continued)

(56) References Cited

U.S. PATENT DOCUMENTS 6,084,590 A * 7/2000 Robotham .............. G06T 13/00
345/419
6,226,615 B1 5/2001 Kirby et al.
(Continued)

FOREIGN PATENT DOCUMENTS

EP 1308956 5/2003
KR 100554397 2/2006
(Continued)

OTHER PUBLICATIONS

Martinez, F., et al. "CATS: A Multimedia Tool for Scenographic Simulation in Theatre and TV." Digital Media: The Future. Springer London, 2000. 186-202.*
(Continued)

*Primary Examiner* — Paras D Shah
(74) *Attorney, Agent, or Firm* — Fleit Gibbons Gutman Bongini Bianco PL; Jon A. Gibbons

(57) ABSTRACT

One or more embodiments present positional information associated with a text to a user. In one embodiment, a determination is made that at least one line from a digital representation of text has been selected. Another determination is made that the line is associated with a set of positional information. The set of positional information is presented on a digital representation of a venue along with the presentation of the line of text.

20 Claims, 29 Drawing Sheets

Related U.S. Application Data which is a continuation-in-part of application No. 13/169,867, filed on Jun. 27, 2011, now Pat. No. 8,888,494.

(60) Provisional application No. 61/769,997, filed on Feb. 27, 2013, provisional application No. 61/358,961, filed on Jun. 28, 2010, provisional application No. 62/127,884, filed on Mar. 4, 2015.

(51) Int. Cl.

| | |
|---|---|
| *G06F 3/0484* | (2013.01) |
| *G06F 3/0481* | (2013.01) |
| *G09B 5/02* | (2006.01) |
| *G06F 17/21* | (2006.01) |
| *G09B 19/00* | (2006.01) |
| *G09B 19/04* | (2006.01) |
| *G06F 3/16* | (2006.01) |

(52) U.S. Cl.
CPC ............ *G06F 3/165* (2013.01); *G06F 17/212* (2013.01); *G09B 5/02* (2013.01); *G09B 19/00* (2013.01); *G09B 19/04* (2013.01); *G10L 13/00* (2013.01)

(58) Field of Classification Search
CPC ......... G10L 2013/0008; G10L 2105/00; G10L 2105/08; G10L 2105/221; G10L 2105/225; G10L 2105/228; G06F 17/20; G06F 17/21; G06F 17/24; G06F 17/27; G06F 3/16; A63F 9/24; B60R 60/0373; G01C 21/3608; G09B 19/04; H04M 1/271; H04M 3/4936
USPC ........ 704/258, 260, 267, 270, 272, 275, 271
See application file for complete search history.

(56) References Cited

U.S. PATENT DOCUMENTS

| | | | | |
|---|---|---|---|---|
| 8,225,228 B2* | 7/2012 | Marinkovich | ........ | G06F 3/0481 715/786 |
| 8,583,605 B2* | 11/2013 | Roenning | ......... | G06F 17/30041 707/687 |
| 8,977,113 B1* | 3/2015 | Rumteen | ................ | A63F 13/47 386/341 |
| 9,030,477 B2* | 5/2015 | Schnitzer | ............ | G11B 27/034 345/473 |
| 2003/0200858 A1 | 10/2003 | Xie | | |
| 2005/0022125 A1* | 1/2005 | Powell | ................... | G11B 27/34 715/704 |
| 2006/0248463 A1* | 11/2006 | Forkner | ............ | G06F 17/30899 715/730 |
| 2007/0162854 A1* | 7/2007 | Kikinis | .................. | A63F 13/10 715/719 |
| 2009/0024963 A1* | 1/2009 | Lindley | .................. | G06T 19/00 715/839 |
| 2010/0318364 A1* | 12/2010 | Kurzweil | .............. | G10L 13/043 704/260 |
| 2011/0320198 A1 | 12/2011 | Threewits | | |
| 2012/0311448 A1 | 12/2012 | Achour et al. | | |
| 2013/0151970 A1* | 6/2013 | Achour | ............... | H04N 21/854 715/723 |
| 2013/0173531 A1* | 7/2013 | Rinearson | ......... | G06F 17/30011 707/608 |
| 2015/0030305 A1* | 1/2015 | Moon | ..................... | G06T 13/40 386/201 |

FOREIGN PATENT DOCUMENTS

| | | |
|---|---|---|
| KR | 1020110062738 | 6/2011 |
| WO | 03096323 | 11/2003 |

OTHER PUBLICATIONS

International Search Report & Written Opinion dated Jul. 16, 2014 received for PCT Application No. PCT/US2014/018952.
International Search Report and Written Opinion dated Feb. 27, 2012 for International Application No. PCT/US2011/042027.
Internet Data: Http://itunes.apple.com/kr/app//id406604588?mt=8 (Woongjin Thinkbig, Inc.) dated Dec. 23, 2010.

* cited by examiner

THERE GOES THE BRIDE 51

ACT TWO

*The scene is the same—The action is continuous.*

URSULA (*edges her way to the door*): I'll be two minutes at the most. Er—(*Then brightly*) You wouldn't like to go on ahead would you, with my father?
BABCOCK: No chance.
URSULA: No. Jolly good, quite right, let's all go together eh?
BABCOCK: Too true.
URSULA: Yes, just one big happy family.
*She laughs gaily and exits.*
GERALD: I don't know what she's got to be so cheerful about, I'm sure. By the way I want to apologise for calling you Babcock, Mr. Alcock. I don't know what on earth made me think of it. I mean it's not as if I've ever known anyone called Babcock. Can I give you a small refill?
BABCOCK: No. Make it a large one.
GERALD (*gets Champagne*): Large one coming up, sir. I mean it's such a damn silly name isn't it? (*Pours the Champagne*) Babcock, eh. That reminds me, we had a boy at school called Haddock. We used to call him fish-face. (*He chuckles, then stops*) No I'm wrong, that was Salmon. Well Cheers.
BABCOCK (*Flatly*): Cheers.
*They drink.*
GERALD: It's a funny thing about names, Mr. Pollock.

*He sits down beside MR. BABCOCK and accidentally squashes BABCOCK'S top hat. BABCOCK closes his eyes in anguish, but GERALD oblivious of what he's done carries on regardless.*

It's never been my strong suit, you know. Even when I was in practice I couldn't tell one patient from another. I remember once we had a Mrs. Shufflebotham in the surgery. Now you wouldn't think you could forget a name like Shufflebotham, would you? Well, there she was, sitting in the surgery, and I said to her—
BABCOCK: Would you mind standing up.
GERALD: No, nothing like that, no. What I said was—
BABCOCK (*still controlling his rage*): You're sitting on my hat.
GERALD: No, I said nothing of the sort. Sitting on my hat, indeed. No, what I said was . . .—(*Suddenly*) Oh. (*Gets up*) I'm so sorry. I do beg your pardon—
*He rises and picks up the dented top hat. As he and BABCOCK stare at it there is a sound of banging coming from upstairs.*
BABCOCK: What's that?
*DAPHNE enters.*
DAPHNE: Gerald, you must come at once. I think Ursula's going to kill—(*She suddenly sees BABCOCK*) Oh! (*gushingly to BABCOCK*)

| Field Name | Value |
|---|---|
| Script ID 908 | Script A 920 |
| Line ID 910 | Line 3 922 |
| Line Sequence ID 912 | 2500 924 |
| Line Type 914 | Dialog (with Stage Directions) 926 |
| Character 916 | Greta 928 |
| Dialog 918 | Come in Martha. A storm is approaching. (MARTHA JUST HOLDS THE TEDDY BEAR) My poor dear Martha. What a sad sight. I will be your strength. 930 |
| ... | ... |

| Field Name | Value |
|---|---|
| Script ID 1008 | Script A 1016 |
| Character Name 1010 | Greta 1018 |
| Avatar 1012 | G 1020 |
| Type 1014 | Role 1022 |
| ... | ... |

| Field Name | Value |
|---|---|
| Script ID 1108 | Script A 1116 |
| Line ID 1110 | Line M, Line Record N 1118 |
| Sequence 1112 | Cue 1<br>Cue 2 1120 |
| Cue 1114 | Cue 1: Ring Doorbell Twice<br>Cue 2: Knock 3 times 1122 |
| ... | ... |

| Field Name | Value |
|---|---|
| Script ID 1208 | Script A 1214 |
| Stage ID 1210 | Stage A 1216 |
| Stage Image 1212 | Image A 1218 |
| ... | ... |

1202, 1204, 1206

| Field Name | | Value | |
|---|---|---|---|
| Script ID | 1308 | Script A | 1316 |
| Actor Name | 1310 | Jane Doe | 1318 |
| Role | 1312 | Gretta | 1320 |
| Contact Information | 1314 | Phone 1
Email 1 | 1322 |
| ... | | ... | |

1304 → (Field Name header) ; 1306 → (Value header) ; 1302 (table)

FIG. 13

| Field Name | | Value | |
|---|---|---|---|
| Script ID | 1408 | Script A | 1414 |
| Performance Date | 1410 | Date 1 | 1416 |
| Number of Performances | 1412 | 2 | 1418 |
| ... | | ... | |

1404 → (Field Name header) ; 1406 → (Value header) ; 1402 (table)

| Field Name | Value | |
|---|---|---|
| Script ID | 1508 | Script A | 1518 |
| Performance Date | 1510 | Performance Record 1 | 1520 |
| Actor | 1512 | Actor Record 1 | 1522 |
| Line ID | 1514 | Line Record X | 1524 |
| Comment | 1516 | Director/Stage Manager Notes | 1526 |
| ... | | ... |

1504 → (Field Name column)  1506 → (Value column)

| Field Name | Value | |
|---|---|---|
| Script ID | 1608 | Script A | 1622 |
| Line ID | 1610 | Line X | 1624 |
| Sequence | 1612 | 1 | 1626 |
| Character | 1614 | Greta | 1628 |
| Stage ID | 1616 | Stage A | 1630 |
| Xpos | 1618 | xPos1 = 50 | 1632 |
| Ypos | 1620 | yPos1 = 30 | 1634 |
| ... | | ... |

1604 → (Field Name column)  1606 → (Value column)

FIG. 16

BLACKOUT                                                                 Page 26

*THROWS THE WHISKEY ON HIM.) And another. (THIS TIME GRETA
HOLDS THE SHOT GLASS RIGHT IN FRONT OF HIM. CONROY GOES
FOR IT BUT SHE PULLS IT AWAY) Sign. (CONROY READS THE PAPERS
THEN TAKES THE PEN FROM GRETA AND SIGNS. (SHE HANDS HIM
THE SHOT GLASS AND HE THROWS IT BACK QUICKLY. GRETA LOOKS
AT THE PAPER) That's a good boy Peter.*
    *A LOOK OF TERROR COMES OVER THE FACE OF PETER
    CONROY. HE BACKS AWAY AND SWIPES THE BOTTLE OFF
    THE TABLE AND HURRIEDLY EXITS. GRETA LAUGHS.*

ACT II/Scene 2

*IT IS THE NEXT AFTERNOON. MARTHA IS SITTING AT THE
TABLE ON THE TERRACE. SHE IS HOLDING A TEDDY BEAR.
THERE IS THE SOUND OF DISTANT THUNDER. GRETA
COMES IN AT THE EDGE OF THE RAMP WITH AARON. SHE
HAS THE OUIJA BOARD IN HER LAP.*

GRETA: Come in Martha. A storm is approaching. *(MARTHA JUST HOLDS THE TEDDY BEAR)* My poor dear Martha. What a sad sight. I will be your strength.
MARTHA: *(DAZED)* Remember who this is? It's Will-a-bee. I found Will-a-bee on the kitchen table this morning. David said that he named his teddy bear because he would steal honey. And he made a little song, "Will a bee, will a bee, will a bee sting me?" Then David gave Will-a-bee to Rosemary. Tell me you remember that story Greta.
GRETA: *(HOLDING HER HAND)* I do, dear Martha. I do remember.
MARTHA: Have the police found Rosemary. *(GRETA SHAKES HER HEAD BITTER)* Why haven't they found my daughter? *(SHE SOBS SOFTLY)*
GRETA: So typical of the inept leadership. Chief Fitzgerald can't be located, our Mayor mysteriously resigns then vanishes. Kate can't find him. *(PAUSE)* Martha, I have made arrangements for you to be sent away for a few days...
MARTHA: Oh please, no Greta, I don't want to be sent away. They'll hurt me in the hospital, please no...
    *ENTER SARAH WEARING BOYS PANTS WITH SUSPENDERS
    AND A DRESS SHIRT*

SARAH: Hello Grandma Wickersham. Mrs. Wickersham.
GRETA: *(SMILING)* Look Martha. A ray of sunshine brightens our dark world.
MARTHA: Why are you wearing those clothes?
GRETA: I am having her clothes washed since we can't disturb Kate for any clean clothes.
SARAH: My mother still hasn't come for me?
GRETA: Doctor Haskins called about an hour ago. The stress of the past few days have taken their toll on her. Your mother asked me to watch over you for another day or two.
SARAH: *(CONCERNED)* Is she alright? Can I telephone her?
GRETA: Doctor Haskins said just allow a few days rest.
SARAH: This isn't like her to leave me, Grandma Wickersham. Maybe something has happened to her.
GRETA: She is fine Sarah. And how are you feeling?
SARAH: Just very tired. I think that Doctor Haskins has been making me

| # | Part | Dialog |
|---|---|---|
| 1 | | ACT II / Scene II |
| 2 | | IT IS THE NEXT AFTERNOON... |
| 3 | Greta | Come in Martha. A storm is approaching. (MARTHA JUST HOLDS THE TEDDY BEAR) My poor dear Martha... |
| 4 | Martha | (DAZED) Remember who this is?... |
| 5 | Greta | (HOLDING HER HAND) I do dear Martha... |
| 6 | Martha | Have the police found Rosemary. (GRETA SHAKES HER HEAD. BITTER) Why... |
| 7 | Greta | So typical of the inept leadership. Chief Fitzgerald ... |
| 8 | Martha | Oh please, no Greta... |
| 9 | | ENTER SARAH... |
| 10 | Sarah | Hello Grandma... |
| ... | | ... |

Role
- ☐ Aaron  ☒ Martha
- ☐ Greta  ☐ Sarah
- ☐ Phillip

Notes:

Text for notes associated with the selected line(s)

| | ACT I ||| ACT 2 ||
| --- | --- | --- | --- | --- | --- |
| | Scene 1 | Scene 2 | Scene 3 | Scene 1 | Scene 2 |
| Character 1 | 1, 10, 15, 19, 23, 27, 32, 47, 51-93 | 0 | 127, 130, 136, 139, 140, 147, 150, 153 | 291, 344 | 367, 370, 373, 375, 379, 391, 410 |
| Character 2 | 11, 14, 16, 18, 20, 22, 24, 26, 28, 31, 33, 46, 48, 50, 90, 93 | 143, 145, 149, 153, 157, 160, 133, 167, 171, 179, 181 | 0 | 0 | 368, 371, 372, 374, 376, 378, 392, 406, 409 |
| Character 3 | 0 | 91, 93, 97, 101, 108, 113, 117, 119, 127, 129, 134, 141, 148, 152, 161, 165, 172, 180, 190, 213, 215 | 216, 225, 228, 232, 234, 236, 248, 252, 263, 266, 272, 278, 284, 285, 287, 295 | 0 | 0 |
| Character 4 | 74, 77, 81, 84, 87, 91, 93 | 92, 94, 96, 98, 100, 109, 112, 118, 120, 126, 128, 130, 132, 142, 147, 153, 160, 162, 164, 165, 171, 173, 179, 191, 212, 214 | 226, 227, 229, 221, 223, 237, 245, 253, 262, 267, 272, 279, 283, 286, 287, 290 | 322, 244 | 345, 366, 369, 393, 405, 411 |
| Character N | ... | ... | ... | ... | ... |

3102, 3142, 3104, 3144, 3146, 3152, 3106, 3154

INTERACTIVE BLOCKING AND MANAGEMENT FOR PERFORMING ARTS PRODUCTIONS

CROSS-REFERENCE TO RELATED APPLICATION

This application is based upon and claims priority to U.S. patent application Ser. No. 13/826,503 filed on Mar. 14, 2013 now U.S. Pat. No. 9,122,656, which is based on and claims priority from Patent Application Ser. No. 61/769,997 filed on Feb. 27, 2013, the disclosure of each patent application referenced above is hereby incorporated by reference in their entireties.

U.S. patent application Ser. No. 13/826,503 is also a continuation-in-part of U.S. patent application Ser. No. 13/169,867 filed on Jun. 27, 2011 now U.S. Pat. No. 8,888,494, which is based upon and claims priority to U.S. Provisional Patent Application Ser. No. 61/358,961 filed Jun. 28, 2010, the disclosures of each patent application referenced above is hereby incorporated by reference in their entireties.

FIELD OF THE INVENTION

The present invention generally relates to interactive environments, and more particularly relates to an interactive environment for performing arts scripts.

COPYRIGHT NOTICE

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

BACKGROUND OF THE INVENTION

A basic task performed by an actor is learning/reviewing the lines and any on-stage movements (blockings) for the role that he/she is performing or auditioning for. Although there is no single approach to accomplish this, there are many common approaches and steps. Unfortunately, many of these approaches and steps can be very tedious and inefficient. This can result in the learning/reviewing process becoming less effective and enjoyable for the actor.

SUMMARY OF THE INVENTION

In one embodiment, a method for presenting positional information of an object associated with text is disclosed. The method comprises determining that at least one line of text that has been selected. Another determination is made that the line is associated with a set of positional information. The set of positional information is presented on a digital representation of a stage.

In another embodiment, an information processing for presenting positional information of an object associated with a manuscript to a user is disclosed. The positional information processing comprises a memory and a processor communicatively coupled to the memory. An interactive blocking environment is communicatively coupled to the memory and the processor. The interactive blocking environment is configured to perform a method. The method comprises determining that at least one line from a digital representation of text has been selected. The set of blocking records associated with the digital representation of the text are analyzed based on determining that the at least one line has been selected. A determination is made that the line is associated with at least one positional or blocking record in the set of blocking records. At least one character associated with the line is identified based on determining that the line is associated with at least one blocking record. At least one digital representation of an object, such as a person or object, and in this example an avatar associated with the at least one character is identified. A set of location information associated with the at least one character is determined based on the blocking record. The at least one object, such as a person or object, and in this example an avatar is presented at a location on the digital representation of a venue based on the set of location information.

In a further embodiment, a computer program product for presenting blocking information associated with a manuscript to a user is disclosed. The computer program product comprises a storage medium readable by a processing circuit and storing instructions for execution by the processing circuit for performing a method. The method comprises determining that at least one line from text has been selected. A determination is made that the line is associated with a set of positional or blocking information. The set of positional or blocking information is presented on a digital representation of a venue.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 2 shows one example of a page from a performing arts script;

FIG. 9 shows one example of a line record according to one embodiment of the present invention;

FIG. 10 shows one example of a character record according to one embodiment of the present invention;

FIG. 11 shows one example of a cue record according to one embodiment of the present invention;

FIG. 12 shows one example of a stage record according to one embodiment of the present invention;

FIG. 13 shows one example of an actor record according to one embodiment of the present invention;

FIG. 14 shows one example of a performance record according to one embodiment of the present invention;

FIG. 15 shows one example of a notes record according to one embodiment of the present invention;

FIG. 16 shows one example of a blocking record according to one embodiment of the present invention;

FIG. 18 shows one example of a page from a generated script comprising blocking information according to one embodiment of the present invention;

FIG. 19 shows another example of an interface for providing blocking information to a user according to one embodiment of the present invention;

FIG. 20 shows the interface of FIG. 19 providing additional blocking information to a user according to one embodiment of the present invention;

FIG. 22 shows one example of an interface for entering and/or editing character/line notes according to one embodiment of the present invention;

FIG. 23 shows one example of an interface for providing cue information to a user according to one embodiment of the present invention;

FIG. 31 is an example table generated to enable a user to identify one or characters that may be played by the same person, such as doubling or actors, according to one embodiment of the present invention.

DETAILED DESCRIPTION

Figure 1:
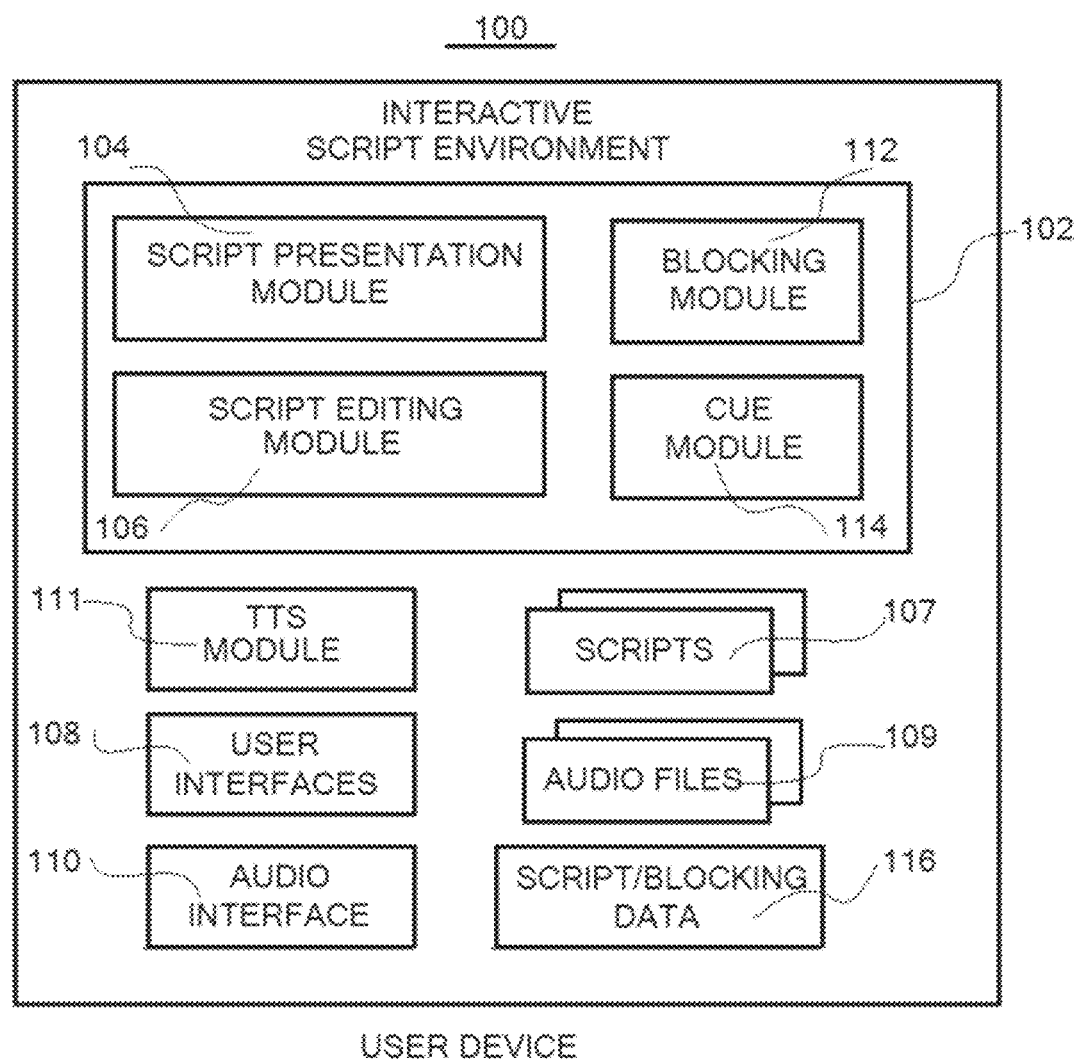
FIG. 1 shows one example of an operating environment according to one embodiment of the present invention.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one as or more than one. The term plurality, as used herein, is defined as two or more than two. Plural and singular terms are the same unless expressly stated otherwise. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The term "electronic device" is intended to broadly cover many different types of electronic devices. For example, and not for any limitation, an electronic device can include any one or a combination of the following: a wireless communication device, a laptop computer, notebook computer, personal computer, Personal Digital Assistant, reading devices, tablets, gaming units, and other electronic devices capable of presenting information to a user via visual, audible, and/or tactile mechanisms.

Conventionally, an actor usually needs to identify his/her lines from the various lines in a manuscript (script). This is sometimes performed by taking a paper version of the script and using a see-through marking device to highlight their lines. From this the actor will familiarize himself/herself with the script dialog and work on learning the lines. As a part of the learning process, the actor needs to read the lines that are not his/hers, and to also not see his/her lines as well. This is typically accomplished by covering the entire dialog with another piece of paper and then sliding the sheet down without revealing his/her dialog to see if he/she knows the next line. The actor then continues to move the paper down revealing the next set of dialog. Once the actor feels that the script has been learned, the actor will often times enlist the aid of another person to read the lines that are not the actor's and provide feedback. More often than not this is completed prior to the first rehearsal.

It is important to note that the terms "dialog" and "dialogue" are used interchangeably through-out this description. Although the term "script" is used here to mean a manuscript, more generally the present invention has been shown to be used advantageously with any text that is a script, television script, a movie script, music, used by an actor in a play, television show, a movie, a musical, a performer in a marching band including a musician or color guard.

Once rehearsal begins, there are usually changes and enhancements to the script. The changes take the form of deleted lines, added lines and changed lines. Also, the actor will often mark "blocking" instructions in the script. "Blocking" is movement that an actor needs to perform such as "Move to left of stage", "Pick up Drink", and is typically not a part of the script as initially written. The actor usually marks these changes and enhancements back into the script. More generally, the term "blocking" can be thought of as location or positional information of an object within a venue. The object may be an actor, a dancer, a marching band participant, a prop or a combination. Also, the venue may be stage, an arena, a field, a stadium, or a combination.

As discussed above, these conventional methods for learning/reviewing lines and other information in a script can be very tedious and inefficient. This can result in the learning/reviewing process becoming less effective and enjoyable for the actor. Therefore, one or more embodiments of the present invention advantageously provide an interactive blocking environment that assists an actor in the various aspects of learning/reviewing his/her lines in a script. The interactive blocking environment also allows an actor to keep track of changes and enhancements to these scripts. Through this environment one or more scripts are presented to a user. Various aspects of the script are rendered (visually and/or with sound) in unique formats to help the actor easily identify them. The presentation of these aspects are highly customizable, but, in one embodiment, default to the most common usage, or expected usage.

The actor/user can select any of the roles of the script and have that role designated as the active role of the script for the learning/review process. The user can set a bookmark on any of the lines in the script and be able to quickly jump to any of the bookmarked lines. The user can also have the lines presented to him/her in an audible format by either recording the lines into a user device, downloading/transferring prerecorded audio files, and/or using text-to-speech technology to speak the lines. When using text-to-speech capabilities, the user can assign a different voice to each role.

The user can create and edit the script on a user device comprising the interactive text environment. Alternatively, the user can create and edit the script on an internet web site, remote system, and/or cloud computing environment and have the resultant script downloaded to the user device. Additionally, changes the user makes to the script on the computing device can be uploaded and stored on the internet web-site, remote system, cloud computing environment, etc.

Other aspects and advantages of the invention will become apparent from the following detailed discussion taken in conjunction with the accompanying drawings which illustrate, by way of example, various embodiments of the present invention.

Operating Environment

FIG. 1 is a block diagram illustrating one example of an operating environment for assisting an actor with the various aspects of learning/reviewing his/her lines in a script of a play, movie, etc., and also in keeping track of the changes and enhancements to these scripts as well. It should be noted that although the following discussion is with respect to actors and performing arts scripts, one or more embodiments of the present invention are applicable to other types of individuals and information mediums such as, but not limited to, musicians and lyric sheets.

In particular, FIG. 1 shows an electronic device 100, herein referred to as the "user device 100". It should be noted that throughout the following discussion the terms "user" and "actor" are used interchangeably unless otherwise noted. The user device 100 can be any electronic device such as a wireless communication device, a laptop computer, notebook computer, personal computer, Personal Digital Assistant, reading devices, tablets, gaming units, and other electronic devices capable of presenting information to a user via visual, audible, and/or tactile mechanisms.

The user device 100, in one embodiment, comprises an interactive blocking environment 102 that allows a user to manage and interact with one or more scripts by, for example, reviewing components of the script, editing the script, annotating the script, and the like. The term "script" or "scripts" as used herein, indicate a representation (printed or digital) of an actor's (or actors') lines and stage directions that are used as the basis of implementing a performing arts event such as (but not limited to) a staged play, television program, movie, commercial, or the like. The interactive blocking environment 102 also allows an actor, director, stagehand, etc. to view and edit blocking positions of each actor and cue information for a given set of lines, scenes, acts, etc., as will be discussed in greater detail below. The interactive blocking environment 102, in one embodiment, comprises one or more selectable components that perform appropriate responses. It should be noted that throughout this discussion, any of the selectable components can be selected by one or more mechanisms such as, but not limited to, voice recognition, contact selection (e.g., with a stylus), and the like. The interactive blocking environment 102 further comprises a script presentation module 104, a script editing module 106, one or more scripts 107, optionally one or more audio files 109, a text-to-speech (TTS) module 111, a blocking module 112, a cue module, 114, and script/blocking data 116.

The script presentation module 104 renders/presents a digital representation of a script to a user via a user interface 108, such as a display, of the user device 100. As will be discussed further below, a script 107 can be presented to a user in various formats that assist in learning/reviewing the script 107. As the process of creating the performing art event progresses, the script 107 can be modified/revised many times. Therefore, the script editing module 106 allows the user to change, add, and remove lines from the script 107 as needed. In addition, the script editing module 106 also allows the user to add annotations, images, video, and the like to the script 107.

The blocking module 112 renders/presents a digital representation of the stage to a user via the user interface 108, such as a display, of the user device 100. The blocking module 112 indicates the position of each actor on the stage during a given line, scene, act, etc. The blocking module 112 also allows a user such as a director to create the blocking positions displayed by the blocking module 112, edit current blocking positions, etc. In one embodiment, the blocking module 112 utilizes the script/blocking data 116 and/or the scripts 107 when presenting blocking information to a user. The cue module 114 similarly displays cue information to a user via the user interface 108. The cue module 114 also allows a user to enter and edit cue information for one or more lines in a script. It should be noted that the script, blocking, and cue modules 104, 112, 114 are not required to be separate modules. For example, one or more of these modules 104, 112, 114 can reside within a single module as well. Also, it should be noted that even though the one or more embodiments identify specific actions/operations performed by a given module 104, 112, 114 any of these modules are able to perform these actions/operations.

The audio files 109, in one embodiment, are each associated with one or more dialog lines in the script 107. The audio files 109 are utilized by the script presentation module 104 to audibly present corresponding dialog lines in the script 107. The user is able to create and play the audio files 109 through an audio interface 110 of the user device 100.

It should be noted that the user can also download or transfer these audio files 109 to the user device 100. The script editing module 106 further allows the user to link these audio recordings to their associated lines in the script 107 so that when the user reaches the given line(s) in script 107 the associated audio recording is either automatically played or manually played. In another embodiment, the interactive blocking environment 102 can monitor, via the audio interface 110, a user's reading of his/her lines and detect when another actor's lines should be read. The script presentation module 104 then automatically plays, via the audio interface 110, the audio file 109 associated with the other actor's line(s). This simulates a reading environment comprising other actors.

The script 107, in one embodiment, can be digitally stored on the user device 100 in memory such as, but not limited to, volatile and/or non-volatile memory. It should be noted that the script 107, audio files 109, and/or modifications/revisions/annotations to the script 107 can be stored remotely from the user device 100 as well. For example, the interactive blocking environment 102 can render/present a script to a user that is stored remotely from the user device 100 on, for example, the user's personal computer, in a cloud computing environment, on a remote server, or the like. The user can also purchase scripts 107 or otherwise obtain digital scripts and download them to the user device 100.

Interactive Blocking Environment

In addition, the functions/operations performed by the interactive blocking environment 102 discussed herein can also be provided by a remote system such as, but not limited to, a cloud computing system. In this embodiment, the interactive blocking environment 102 is an interface such as a browser, mashup, and/or an application that allows the user to interact with the remote system for performing the functions/operations discussed herein.

One advantage of the interactive blocking environment 102 is that it enhances the learning/reviewing process of a script. For example, the interactive blocking environment 102 allows a user to easily identify his/her lines and associated blocking information. By displaying scripting and blocking information a user can not only review his/her lines but also study his/her position on the stage. The interactive blocking environment 102 can also present the script 107 in a way that hides the user's lines from view while displaying the other lines of the script. The user can easily work on a small segment of the script by using navigation facilities such as bookmarks, next, and previous lines. The interactive blocking environment 102 reduces the need for a second person by using the audio and text-to-speech capabilities. These and other aspects of the interactive blocking environment 102 give the user more time to study the script 107. When implemented on a portable device, such a smartphone or tablet, the user can study the script and blocking information during any idle time such as waiting in line.

FIG. 2 shows a sample page 200 from a hardcopy script, typical of that used in the performing arts industry. FIG. 2 further identifies examples of components that are emulated in the script presentation module 104. As can be seen, the page 200 comprises a set of information such as, but not limited to, dialog lines, stage directions, etc. that are associated with each role. In the example of FIG. 2, this set of information is displayed as text. However, other methods of displaying this information can be used as well.

One or more lines in a script 107 can be classified into a category. Examples of various categories are Scene 202, Dialog 204, and Stage Directions 206. A Scene 202 line type indicates the beginning of a new scene or act. The Dialog 204 line type represents words that are spoken by the actor. The Stage Directions 206 line type is information that describes what should be happening beyond just the spoken word, such as, but not limited to, what the stage looks like, where actors should be positioned, what the lighting should be, how lines should be interpreted, what props are used, etc. This information is generally not spoken by an actor. The stage directions are typically indented and in italics to help differentiate them from dialog lines. Any single one of these line types (or categories) 202, 204 or 206 can be considered one line regardless of the number of sentences that item may include.

With respect to dialog lines 204, there is an indication of what role 208 is speaking the line. For example, FIG. 2 shows that the role of "BABCOCK" is speaking the line that includes the dialog "Too True.". In addition, there are sometimes stage directions 210 embedded within a dialog line. The accepted indication of an embedded direction is that they are enclosed in parentheses and italicized. For example, FIG. 2 shows a stage direction of "(Flatly)" that is enclosed in parentheses and italicized. However, other methods can be used to identify stage directions as well.

Figure 3:
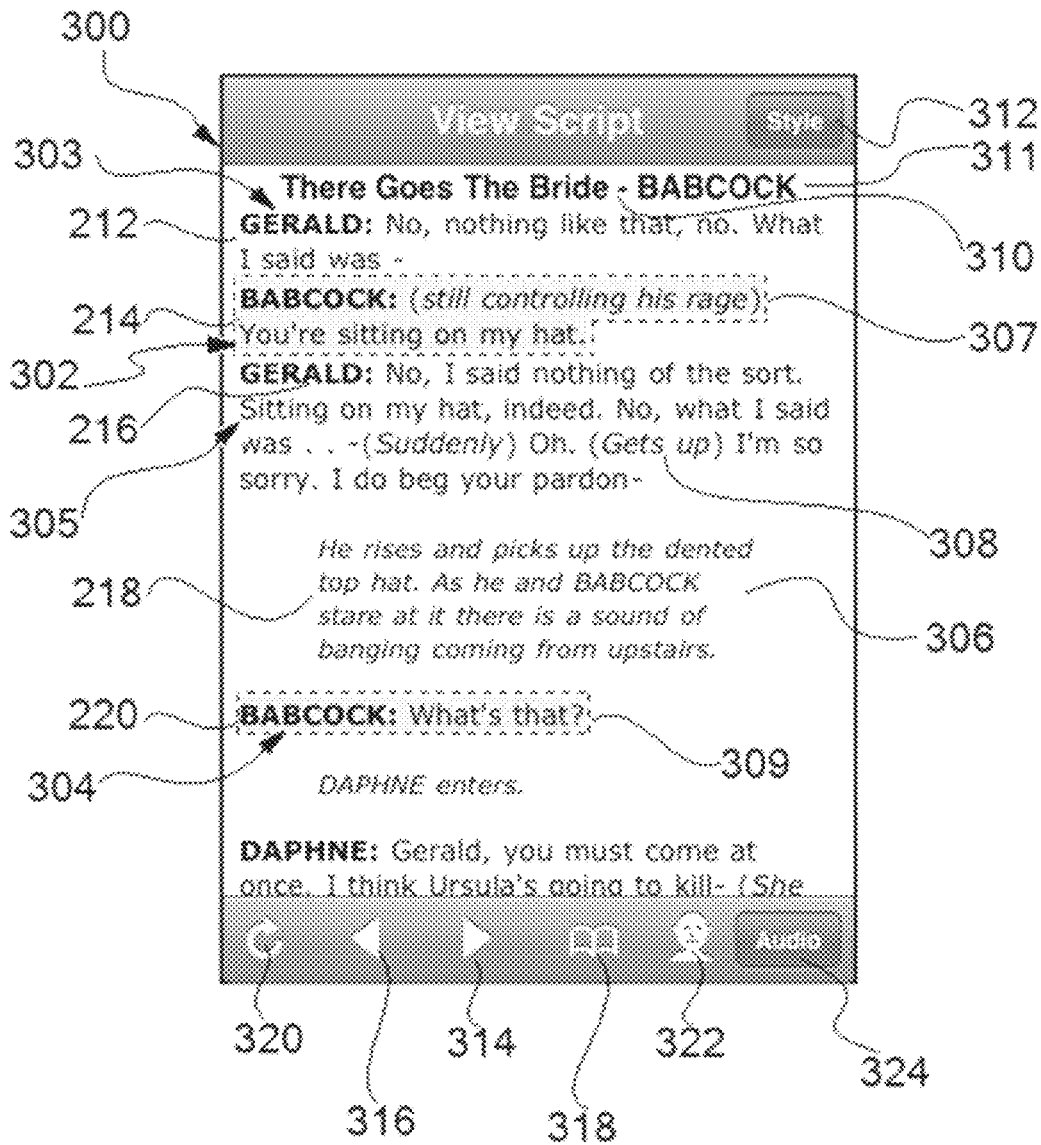
FIG. 3 shows one example of an interactive blocking environment according to one embodiment of the present invention.

FIGS. 3-8 illustrate various examples of a user interacting with the interactive blocking environment 102 using the sample script page 200 of FIG. 2. The lines of the script that are presented to the user in FIGS. 3-8 are collectively identified in FIG. 2 as group 226. Also for exemplary purposes only, the active role for this user is considered to be BABCOCK. The lines identified in group 226 are broken down to their basic lines as follows:
- 212—Dialog line
- 214—Dialog line for active role BABCOCK
- 216—Dialog line
- 218—Stage Directions
- 220—Dialog line for active role BABCOCK
- 222—Stage Directions
- 224—Dialog line After the user has initiated the interactive blocking environment 102 and selected a given script 107, the script 107 is presented to the user in a primary window 300 via the script presentation module 104. It should be noted that the script 107 can be automatically displayed to the user without requiring the user to manually select the script 107. The primary window 300, in one embodiment, is the main window of the interactive blocking environment 102 that is utilized by the user for learning/reviewing the script 107. As can be seen in FIG. 3, the window 300 displays at least a portion of a page of the script 107.

The script presentation module 104 presents dialog lines 214, 220 associated with the active role (BABCOCK in this example) in one or more regions 302, 304 of the window 300 and presents dialog lines 212, 216 associated with the non-active roles (e.g., GERALD) in one or more other regions 303, 305. The script presentation module 104, in one embodiment, presents active role dialog lines 214, 220 to the user in a visually different manner than non-active role lines 212, 216. FIG. 3 shows one example where the active role dialog lines 214, 220 are highlighted (as indicated by the dashed boxes 307, 309) and the non-active role dialog lines 212, 216 are not highlighted. For example, the active role dialog lines 214, 220 can be highlighted with a yellow background, while the non-active dialog lines 212, 216 have a white background. However, any type of visual mechanism can be used to distinguish active role dialog lines 214, 220 from non-active role dialog lines 212, 216. It should be noted that the user is able to select the active role and/or non-active roles through the interactive blocking environment 102. Also, to help more easily identify dialog lines the script presentation module 104 can further visually alter the dialog lines. For example, FIG. 3 shows that for each dialog line 212, 214, 216, 220 the role (e.g., BABCOCK and GERALD) have been presented in a bold font. However, any type of visual mechanism can be used to distinguish dialog lines from other types of lines.

The script presentation module 104 also presents stage direction lines 218 to the user in one or more additional regions 306 of the window 300. In one embodiment, the stage direction lines 218 are indented and italicized to substantially represent industry accepted standards for stage directions. With respect to embedded stage directions 308 for a given dialog line 216, the script presentation module 104 presents these stage directions 308 in an italicized font as is standard practice for hard-copy scripts. However, any type of visual mechanism can be used to identify embedded stage directions. The script presentation module 104 can also display the name/title of the currently displayed script in yet another region 310 of the window 300. In one embodiment, the current active role 311 can also be displayed in this region 310 or another region as well.

The following are additional examples of various aspects of a script 107 that can be presented to a user through the interactive blocking environment along with presentation characteristics to help a user identify one type of displayed information from another. Lines for the role that pertains to the user can be displayed, for example, with a black foreground/yellow background. Lines for roles that do not pertain to the user can be displayed, for example, with a black foreground/White background. A role name can be displayed, for example, in bold font. Script information that is not dialog, such as stage directions, can be displayed, for example, with italicized and indented font. Stage directions that are embedded within dialog in a script, which are usually surrounded by parentheses, can be displayed, for example, with italicized font. Dialog that is spoken simultaneously with another role can be displayed, for example, with a red foreground. Long runs of dialog that are spoken in parallel with another actor can be displayed, for example, with each run in a unique foreground color. Sung dialog can be displayed, for example, with uppercase and bolded font.

The script 107 can be presented to the user in a variety of approaches through which the user can move forward and backward through the script 107. For example, the script presentation module 104 can present the script is various different modes such as a Scene mode, Role mode, Script mode, Line mode, Redacted mode, and the like. FIG. 3 shows the script 107 being displayed in Scene mode where all lines for a given scene are rendered in the window regardless of the type of the line. This allows the user to view the lines a scene at a time. Each scene is presented to the user on a separate scrollable page. In the Role mode all lines for one or more roles are presented to the user. Lines are divided into groups: a) lines that are for the active role and b) all other lines. This mode alternatively shows in a window all contiguous lines for the active role (a) and then renders all contiguous other lines (b). This alternating sequence is repeated for the entire script. In the Script mode the entire script is rendered and presented to the user. In the Line mode each line of the script is rendered by itself in a window and the user can view the lines a single line at a time. In the Redacted mode one or more lines of text are redacted or hidden from the user. The user can select which line to redact either based on type or custom selection of lines. For example, this mode can be similar to the Scene mode except that the words for the lines of the active role cannot be read. It should be noted that the interactive blocking environment 102 can include other rendering/presentation modes as well. The user is able to select a rendering/presentation mode via an on-screen widget such as a Style icon/button 312, as shown in FIG. 3.

Figure 4:
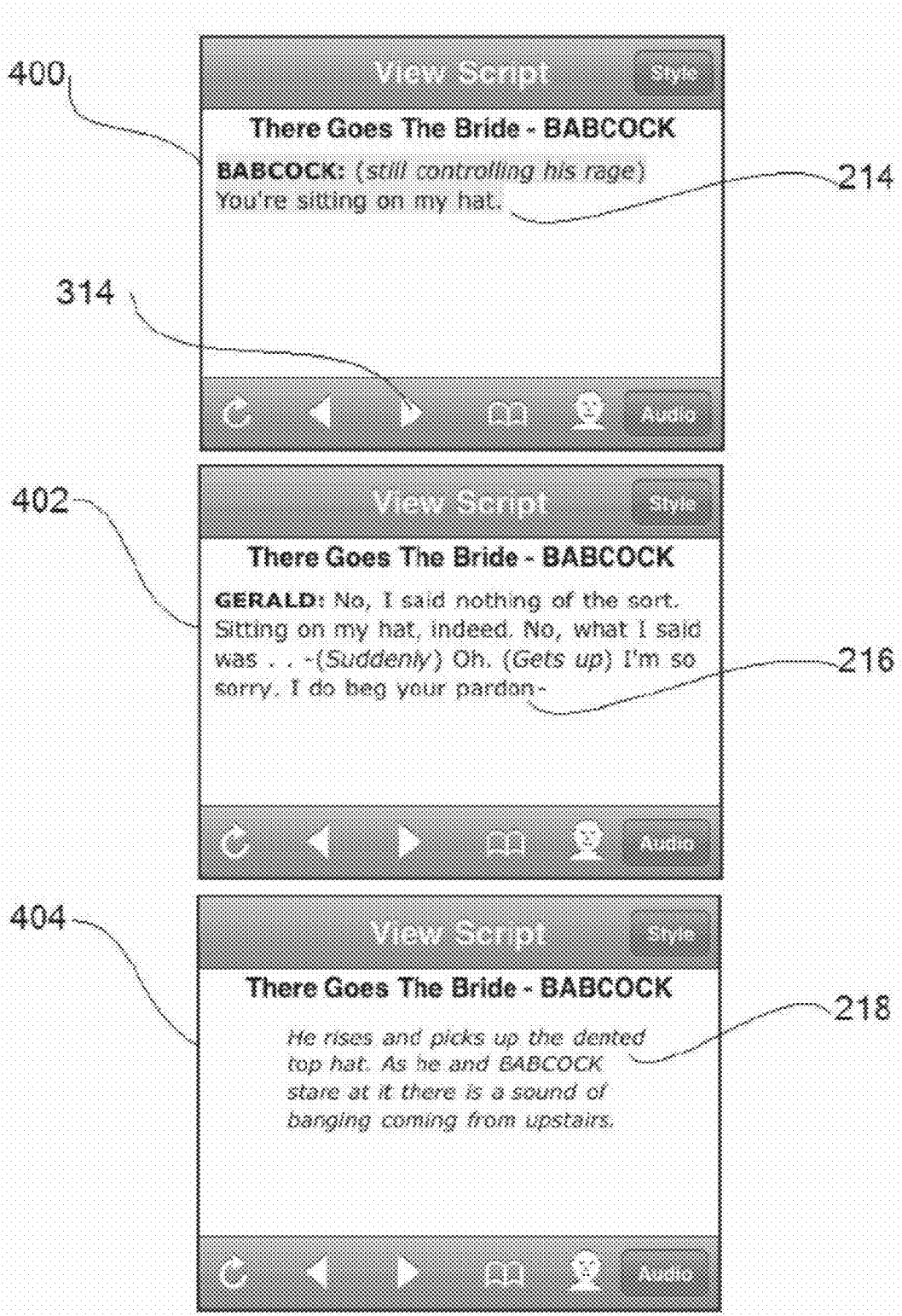
FIG. 4 illustrates one example of presenting a script in a Line mode in the interactive blocking environment of FIG. 1 according to one embodiment of the present invention.

FIG. 4 shows the script 107 being displayed in the Line mode. For example, the first window 400 shows a line 214 from the sample script 200 in FIG. 2. When the Next icon 314 (FIG. 3) is selected the window 400 is updated with the next line 216 in the script 107, as shown in updated window 402. A subsequent selection of the Next icon 314 results in the next line 218 of the script 107 after line 216 being displayed, as shown in updated window 404.

Figure 5:
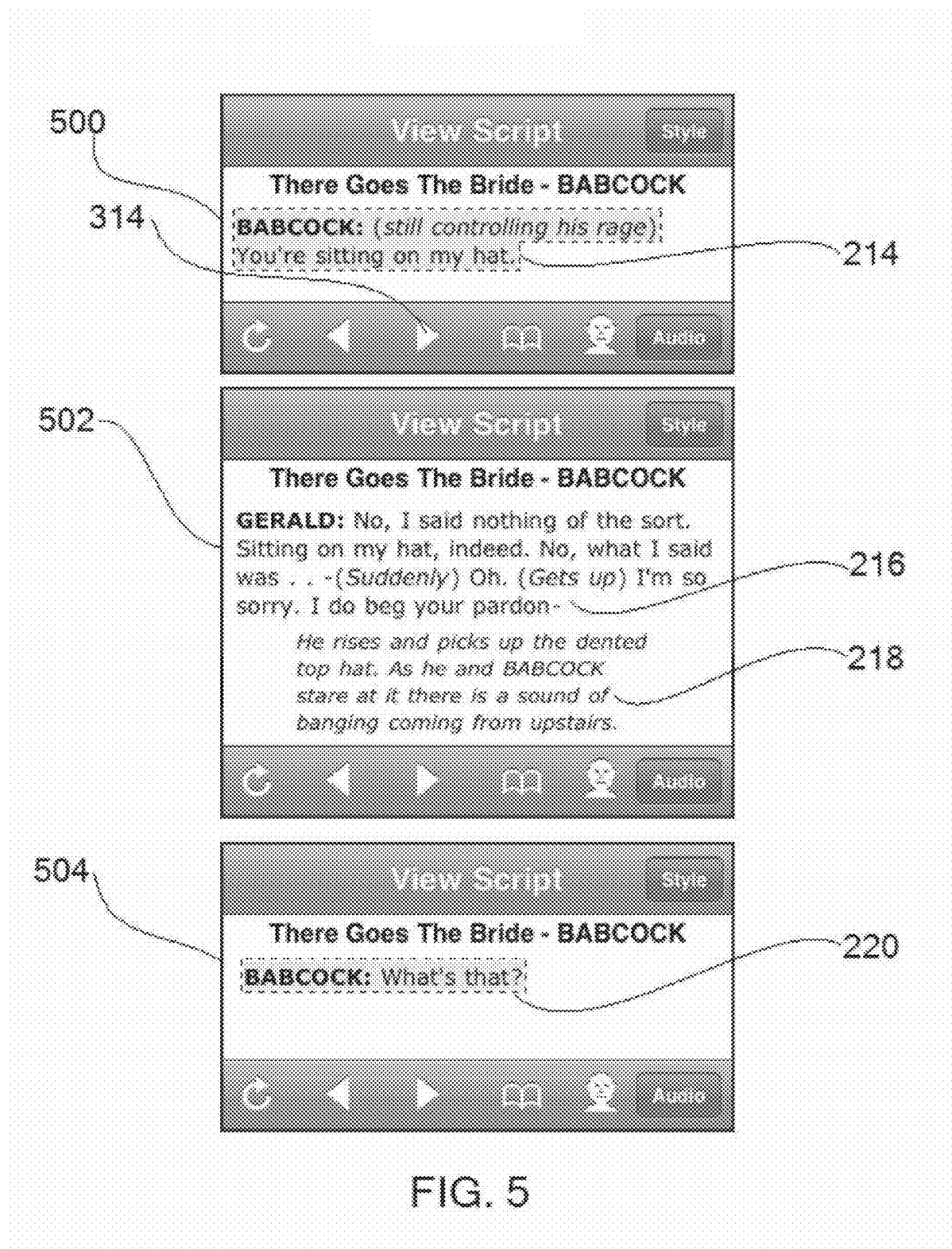
FIG. 5 illustrates one example of presenting a script in a Role mode in the interactive blocking environment of FIG. 1 according to one embodiment of the present invention.

FIG. 5 shows the script 107 being displayed in the Role mode, where the active role is BABCOCK. For example, the first window 500 shows a line 214 from the script 107 that is associated with the active role BABCOCK When the Next icon 314 is selected the window 500 is updated with non-active role lines 216 218, as shown in updated window 502. Two lines are rendered since the next BABCOCK line is not until 220. This window 502, in general, can include all lines up till the next BABCOCK line. A subsequent selection of the Next icon 314 results in the next line 220 of the script 107 being displayed, as shown in updated window 504.

Figure 6:
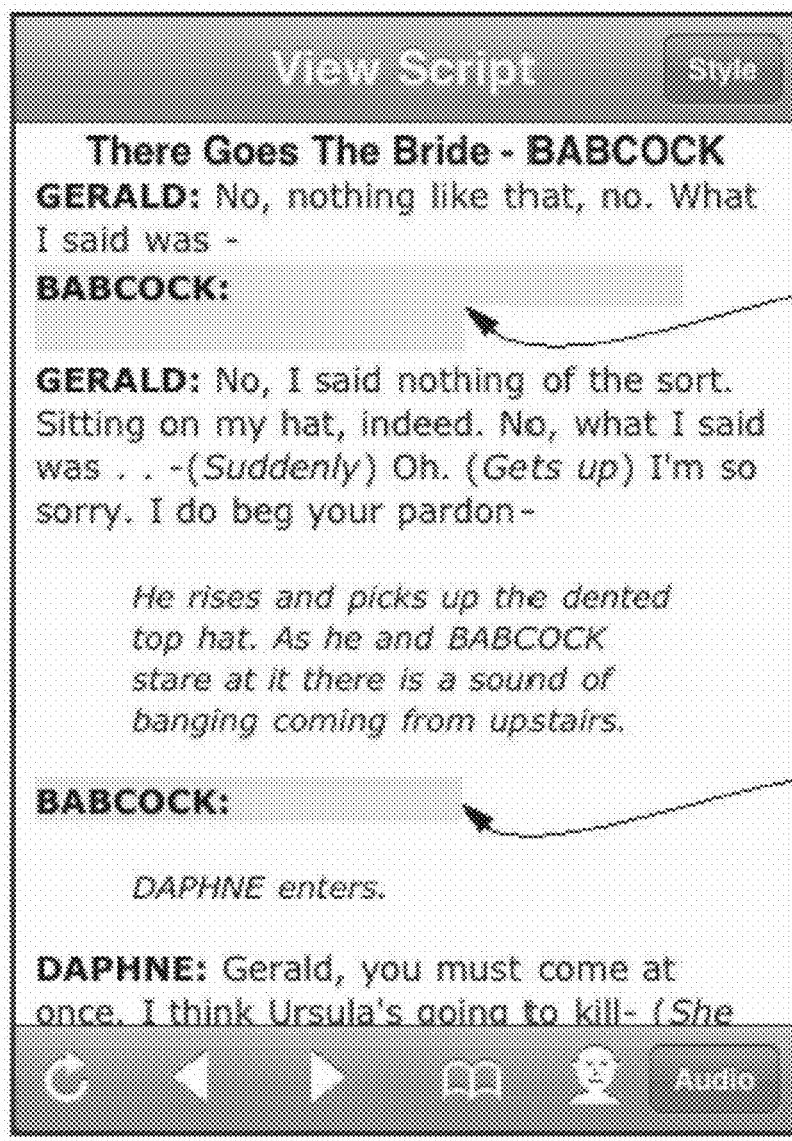
FIG. 6 illustrates one example of presenting a script in a Redacted mode in the interactive blocking environment of FIG. 1 according to one embodiment of the present invention.

FIG. 6 shows the script 107 being displayed in the Redacted mode, where the active role is BABCOCK. As can be seen, the dialog lines 214, 220 for BABCOCK are shown as a placeholder but the text is not rendered. In one embodiment, the user is able to select the redacted lines 214, 220 and have the hidden lines displayed. In another embodiment, when the user selects a redacted line 214, 220 one or more words such as (but not limited to) the first word of the redacted line 214, 220 is displayed to provide a hint to the user. The user can then select or perform an additional action (not shown) which results in one or more words in the redacted line 214, 220 being displayed or have all the words displayed.

Returning to FIG. 3, the user has many options for viewing the lines of a script through the interactive blocking environment 102. For example, to view additional lines that are out-of-view in the window, the user is able to use a pointing device such as a mouse, stylus, or finger to scroll the lines up, down, left, and/or right, which brings new lines (or previous lines) into view. The user can also use the pointing device (or on-screen widgets) to zoom into or out of the script 107. The interactive blocking environment 102 can also present various widgets to the user such as a "Next" or "Previous" icon. Upon selection of the Next icon 314, the window 300 is refreshed to show the next logical grouping of lines as is appropriate for the current viewing mode. Similarly, upon selection of the Previous icon 316, the window 300 is refreshed with the previous logical grouping of lines as is appropriate for the current viewing mode.

Another icon that can be presented to the user is a "Bookmark" icon 318. The Bookmark icon 318 allows the user to place bookmarks anyplace in the script 107. For example, upon selection of the Bookmark icon 318 a new window is presented to the user that comprises a list of bookmarks that user can select. A few examples of bookmarks are "BABCOCK Entrance 1", "BABCOCK Entrance 2", "Act 1, Scene 2", "GERALD sits on hat", etc. When the user selects one of these bookmarks, the window 300 is refreshed with the appropriate grouping of lines where the first line rendered is the line indicated by the selected bookmark.

Yet another icon is a "Previous Bookmark" icon 320. When this icon is selected the window 300 is refreshed to present the same information that was displayed based on the previous bookmark being selected by the user. This makes it very convenient for the user to work on a specific section of the script 107. A "Role" icon 322 can also be displayed to the user. When the Role icon 322 is selected, a selection window is displayed that allows the user to select any of the roles in the script and make that role(s) the active role(s). Alternatively, the user can select non-active roles as well. When the user selects an active role or designates the non-active roles, the window 300 is refreshed to show the lines appropriate for the new active role(s).

It should be noted that a "Search" icon (not shown) can also be presented to the user as well. When this icon is selected the user is able to enter one or more search terms or categories into a search box (not shown). For example, the user can search for a specific word or phrase, particular lines associated with a given role, lines associated with a given scene or act, lines with embedded stage directions, lines annotated by the user, etc. This allows the user to easily and efficiently find information with the script.

Figure 7:
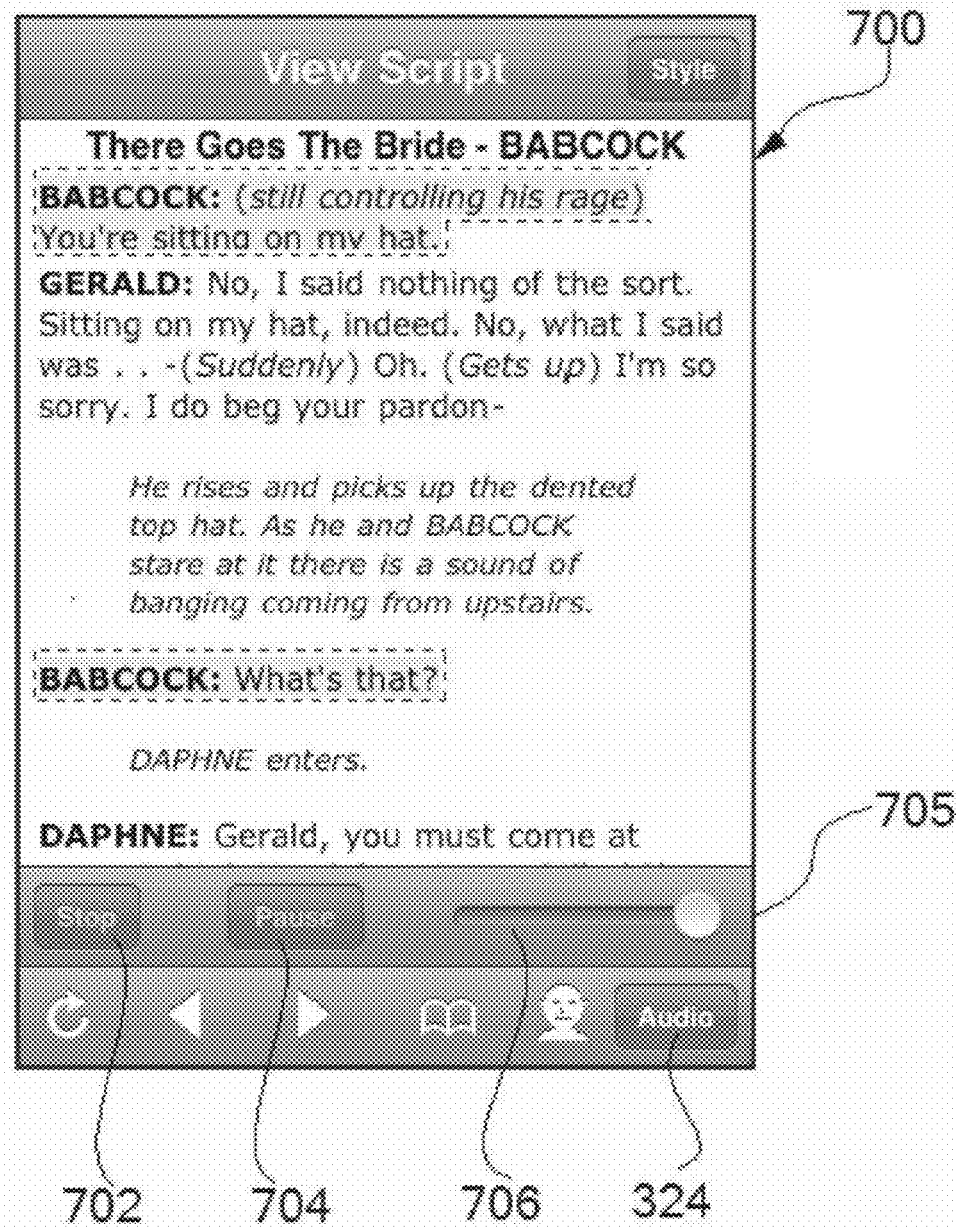
FIG. 7 shows an interactive blocking environment presenting audio options to a user according to one embodiment of the present invention.

FIG. 3 also shows an "Audio" icon 324. When selected, the interactive scripting environment 102 displays (or hides) audio options within a region 705 of the window 700, as shown in FIG. 7. For example, when the user selects the Audio icon 324, in one embodiment, the region 705 is displayed along with the various icons such as start/stop icon 702, a pause 704, and a volume icon 706 shown therein. When the Audio icon 324 is selected again this region 705 along with these icons 702, 704, 706 disappear. It should be noted that the region 705 can remain, but while the icons 702, 704, 706 disappear.

With these audio options the user has the capability of recording audio related to dialog lines, and use those recordings in addition to (or in replacement of) having the text appear on the window. Alternatively, audio files 109 associated with a given role or given lines of dialog can be downloaded and/or stored on the user device 100 for use by the interactive blocking environment 102, as discussed above. Even further, instead of using audio files 109, the interactive blocking environment 102 can utilize the TTS module 111 to audibly present a given set of dialog to the user.

In one embodiment, the user is able to record his/her voice as he/she reads a given line(s) of dialog. This allows a user to capture his/her "performance" of one or more lines of dialog for review. The user is able to start, stop, and/or pause a recording process or a playback process utilizing one or more associated widgets 702, 704. For example, an icon 702 can be displayed to the user that allows the user to either start/stop a recording process or play/stop playback of an audio file 109. In one embodiment, the user is able to select which of the lines to associate with a recording. For example, the user can select one or more lines and be presented with a recording menu (not shown). The user can select a record option from this menu, which associates the recording to the selected lines. A pause icon 704 allows the user to pause a recording process or the playback of an audio file 109. A volume widget 706 allows the user to control the output level of the audio. For example, the user can slide the icon 706 to the left or right to increase or decrease the volume. The above icons 702, 704, 706 and their operations are also applicable to controlling TTS playback of lines of dialog as well.

In one embodiment, the user is able to select a given set of dialog lines and have the corresponding audio file 109 played through the audio interface 110 (e.g., speaker). This selection can be performed by selecting the set of dialog lines directly on the user interface 108 (e.g., display). This selection can be performed utilizing a pointing device, navigating to the set of dialog lines via a mechanical or on-screen navigation device, and/or the like. Once a selection is made, the corresponding audio file 109 can be automatically played or manually played as a result of the user pressing the play icon 702. The user can also pause playback of the file 109 by selecting a pause icon 704. This allows the user to read his/her line then have another actor's lines audibly presented using the corresponding audio file 109 as if an actual human is there reading with the user. This provides the user with a more realistic learning/reviewing experience.

If TTS is used to playback a set of dialog lines, the TTS module 111 can play either non-active role dialog lines or active role dialog lines depending on the current settings of the interactive blocking environment 102. When presenting dialog lines with TTS, the TTS module 111 is able to identify embedded stage directions and prevent these lines from being synthesized into speech. The TTS module can include multiple voices that the user can associate with different roles. This allows the TTS module 111 to play back the lines with the voice associated for that particular role.

In another embodiment, the interactive scripting environment 102 monitors a user's reading of dialog lines and automatically plays (or automatically converts dialog lines via TTS) an audio file 109 associated with a given set of dialog lines. For example, as the user reads his/her dialog line 214 "You're sitting on my hat." the script presentation module 104 monitors this reading through the audio interface 110, which comprises a microphone. The script presentation module 104 analyzes the incoming audio representing the user's voice and identifies the location within the script 107 where the user is currently reading or reciting. For example, the script presentation module 104 can identify the words being spoken by the user and match those words to the words in the script 107. This allows the script presentation module 104 to identify the location in the script 107 at which the user is currently reading or reciting. It should be noted that other methods for determining a location within the script 107 can also be used.

Based on this analyzing, the script presentation module 104 is able to detect when the user has completed his/her line and automatically play the corresponding dialog of another actor. Once the audio from the other actor's lines is played the user is able to read/recite his/her next line. The script presentation module 104 then continues monitoring the user. This embodiment is advantageous because it allows the user to review/learn his/her lines as if he/she was reading with the other cast members in a real-time environment.

In a further embodiment, the script presentation module 104 provides feedback to the user based on his/her performance. For example, a user may want to recite his/her lines from memory without seeing these lines in the interactive scripting environment 102. Therefore, in this embodiment, as the user is reciting his/her lines the script presentation module 104 monitors the words being spoken by the user and determines whether any mistakes have been made. For example, the script presentation module 104 analyzes the incoming audio data representing the user's voice and identifies each word being spoken. The script presentation module 104 identifies the set of lines being recited by the user and compares the user's words to the identified set of lines. The script presentation module 104 then determines if the user has correctly recited the lines or if the user has made a mistake. If the user has correctly recited the lines, the script presentation module 104 can notify the user using any type of visual, audible, and/or tactile mechanisms. For example, a sound, image, message, color, etc. can be displayed to the user to indicate a correct recitation. This notification, in one embodiment, can occur after a given line is read, after the entire scene is read, at an interval customized by the user, or the like.

The script presentation module 104 can also notify the user when a mistake has been made. For example, the script presentation module 104 can detect that the user has forgotten a word(s), recited a word(s) that is not within the current set of dialog lines, etc. When a mistake is detected, the script presentation module 104 can notify the user using any type of visual, audible, and/or tactile mechanisms such as by displaying an image, message, color, etc., playing a sound, generating tactile/haptic feedback, etc. This notification can be presented to the user when a mistake is detected; after the user has finished reciting the set of lines comprising the mistake; after the entire scene has been read; or at any other point in time.

In addition to notifying the user that a mistake has occurred, the script presentation module 104 can display or playback the correct word, words, or portion of the lines so that the user knows what should have been recited. Also, after the user has finished reading his/her set of lines, reading the entire scene, or the like, the user can be displayed annotations in the script 107 that identify the areas of the script 107 at which correct recitations and incorrect recitations were identified. Additionally, a report can be generated with this information as well.

Figure 8:
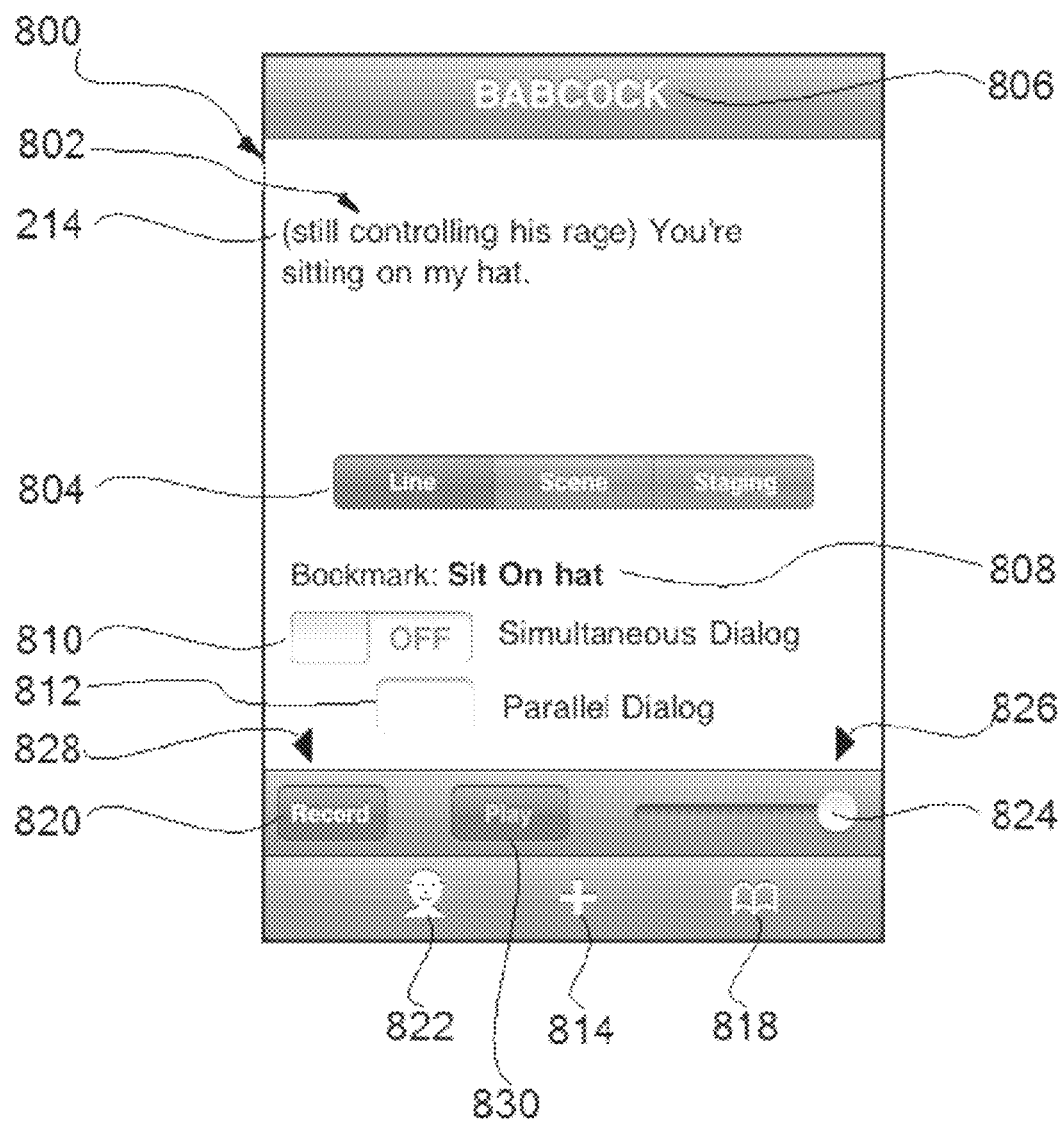
FIG. 8 shows an interactive blocking environment for editing one or more lines of a script according to one embodiment of the present invention.

As discussed above, the user can also edit the script 107 in various ways. FIG. 8 shows one example of a window 800 for allowing the user to edit a script 107. The editing process is managed by the script editing module 106 of the interactive blocking environment 102. In one embodiment, this editing environment allows the user to manually enter notes into the script at any location he/she desires. This allows the user to edit, modify, and/or annotate the information within script and to also add additional material to the script as well.

In one embodiment, the user is able to view and change all aspects of a line within this editing environment. In the example of FIG. 8, line 214 of the script 107 has been displayed in a first region 802 of the window 800. When the user selects this region 802 or the line itself 214, the user is able to modify the contents of the line 214. The line text can include markup language tags (e.g., hypertext markup language (HTML) tags) to allow additional formatting of the text when being played back. A second region 804 of the window 800 indicates what type of line is represented (Scene, Dialog, Stage directions). The user can use a pointing/navigation device to change the line to the desired type. A third region 806 indicates what role is associated with this line 214. A fourth region 808 indicates the name of the bookmark associated with this line if such a bookmark exists. A fifth region 810 indicates whether this line is spoken at the same time as another line. The user is able to change this value. In one embodiment, when dialog is identified as being spoken at the same time by two or more roles, the lines for these two or more roles can be presented together in one line.

A sixth region 812 indicates whether this line is spoken in parallel with another dialog line. A numeric value is assigned to this region to indicate a parallel dialog. All lines relating to the same logical conversation are given the same numeric value. However, other methods for indicating parallel dialog are applicable as well. Upon selecting the role icon 822, a window is displayed showing a list of possible roles that the user can select for association the selected line 214. Selecting the add line icon 814 results in any changes made to the line information being saved and a new line being created. The bookmark icon 818 allows the user to add, change, or delete the bookmark associated with this line. When the record icon 820 is selected the audio interface 110 begins recording and allows the user to make an audio file 109 that is associated with this line 214. This audio file 109 is then available for playback when playing the script 107. The user is able to select the Next icon 826 to advance to the next line and make (or review) a recording. Alternatively, once the user has finished speaking during a recording the user can select the Next icon, which terminates the recording process and advances to the next line. The user can similarly select the Previous icon 828 to return to a previous live and make (or review) a recording. The play icon 830 audibly presents any audio file 109 associated with this line 214. The audio volume icon 824 allows the user to increase or decrease the audio volume by sliding the level indicator left or right.

In addition to the embodiments discussed above the interactive blocking environment 102 also allows a user such as a director, actor, etc. to enter and view blocking and cue information. Throughout this discussion the term "blocking" and its variants refer to the position of an actor(s) on a stage at any given point in time. It should be noted that the following embodiments are utilized in combination with or in addition to the embodiments discussed above. For example, as a user is rehearsing his/her lines using any of the embodiments discussed above the blocking module 112 is configured to display blocking information to the user as discussed below.

In one embodiment, the interactive blocking environment 102 utilizes one or more data tables and records, referred to herein as "script and blocking data 116" or "data 116", to maintain and provide blocking (and cue) information to a user. FIGS. 9-16 show various examples of these data tables/records. For example FIG. 9 shows one example of a line record 902. Each line (including stage directions and cues) of a script 107 is associated with at least one record. Each of these line records 902 can be stored within a separate table, a single table associated with the corresponding script 107, a single table comprising all line records for all scripts, etc. A line record 902 can be populated manually by the user (e.g., director) and/or automatically by the interactive blocking environment 102. For example, the interactive blocking environment 102 can parse a script 107 and identify each of the lines and their sequence, the character/role associated with each line, the type of each line, etc.

In the example shown in FIG. 9, a line record 902 comprises a field column 904 and a corresponding value/attribute column 906. The field column 904 comprises a "Script ID" field 908, a "Line ID" entry 910, a "Location" field 912 a "Line Type" field 914, a "Character" field 916, and a "Dialog" field 918. It should be noted that additional fields/entries can be included as well. Also, one or more of the fields shown in FIG. 9 may be optional. The Script ID field 908 comprises a corresponding entry 920 under the value/attribute column 906 that identifies the script 107 comprising the line associated with the record 902. The Line ID field 910 comprises a corresponding entry 922 that uniquely identifies the line with respect to the remaining lines in the script 107. In one embodiment, the Line ID entries 922 are sequential numbers assigned to each line based on their occurrence in the script 107. Alternatively, the Line ID entries 922 are sequential numbers assigned to each line based on their occurrence in a given portion of the script

107 such as a given act and/or scene. However, other mechanisms for uniquely identifying the lines are applicable as well.

The Line Sequence ID 912 field comprises a corresponding entry 924 that identifies where in the sequence of lines the current line is situated. For example, consider an original script comprising lines 1-500. Each of these lines can be assigned a corresponding line sequence ID of 1000 to 50,000, respectively, where line sequence ID 1000 corresponds the first line (line 1) and line sequence ID 50,000 corresponds to the last line (line 500). Now consider a line that is added to the script between original lines 2 and 3. The newly added line is assigned a line sequence ID of 2500 to indicate that this new line was inserted between original line 2 (line sequence ID 2000) and original line 3 (line sequence ID 5000).

The Line Type field 914 comprises a corresponding entry 926 that identifies the line type of the line associated with the line record 902. For example, FIG. 9 shows that the line is a dialog line (i.e., spoken by an actor) along with stage directions (an action to be performed by one or more of the actors). The Character field 916 comprises a corresponding entry 928 that identifies the character in the play that is associated with the line. In another embodiment, the Character field 916 comprises a pointer/link to a character record/table 1002 (FIG. 10) associated with the character. The Dialog field 918 comprises a corresponding entry 930 including the text of the line and any stage directions or cues if applicable. It should be noted that an additional field (not shown) can be included within the line 900 record that identifies which part of the script (Act, Scene, etc.) the line is located within. For example, this field can indicate that a given line is located within Act II/Scene II of the script 107. It should be noted that varying levels of granularity can be used when entering or selecting Line Location information.

FIG. 10 shows one example of a character record 1002 that is stored/maintained within the data 116. A character record 1002 maintains information associated with one or more characters in a given script 107. For example, a character can refer to the given role associated with a line, an ensemble character that is on stage while another character is reciting his/her line, or a prop item. Each character record can be stored within a separate table, a single table associated with the corresponding script 107, a single table comprising all character records for all scripts, etc. The user can manually enter the character record information and/or the interactive blocking environment 102 can automatically populate the record 1002 with the information discussed below.

In the example shown in FIG. 10, a character record 1002 comprises a field column 1004 and a corresponding value/attribute column 1006. The field column 1004 comprises a "Script ID" field 1008, a "Character Name" field 1010, an "Avatar" entry 1012, and a "Type" field 1014". It should be noted that additional entries can be included as well. Also, one or more of the fields shown in FIG. 10 may be optional. The Script ID field 1008 comprises a corresponding entry 1016 under the value/attribute column 1004 that identifies the script 107 comprising the character associated with the record 1002. The Character Name field 1010 comprises a corresponding entry 1018 that identifies the character in the play associated with the record 1002.

The Avatar field 1012 comprises a corresponding entry 1020 such as a letter(s), number(s), image(s) and/or the like that is used to uniquely represent the character in the interactive blocking environment 102. In the example shown in FIG. 10, the character Greta is represented with the letter "G". However, other mechanisms for representing a character are applicable as well. Type field 1014 comprises a corresponding entry 1022 identifying the character type of the character associated with the record 1102. For example, a character can be a role character reciting a dialog line, an ensemble character that is on stage during another character's recitation of a line, a prop item, etc. The Type field indicates which of these character types (or other types) the character is.

FIG. 11 shows one example of a cue record 1102 that is stored/maintained within the data 116. A cue record 1102 maintains information associated with one or more cues for a given line(s) in a script 107. Examples of cues include (but are not limited to lighting changes, sound generation, etc.) Each cue record can be stored within a separate table, a single table associated with the corresponding script 107, a single table comprising all cue records for all scripts, etc. The user can manually enter the cue record information and/or the interactive blocking environment 102 can automatically populate the record 1102 with the information discussed below.

In the example shown in FIG. 11, a cue record 1102 comprises a field column 1104 and a corresponding value/attribute column 1106. The field column 1104 comprises a "Script ID" field 1108, a "Line ID" field 1110, a "Sequence" field 1112, a "Cue" field 1114, and a "Type" field 1116. It should be noted that additional field can be included as well. Also, one or more of the fields shown in FIG. 11 may be optional. The Script ID field 1108 comprises a corresponding entry 1116 under the value/attribute column 1104 that identifies the script 107 comprising the cue associated with the record 1102. The Line ID field 1110 comprises a corresponding entry 1118 that identifies the line(s) in the script 107 associated with the cue. Alternatively, the value/attribute 1118 is a link/pointer to the line record 902 associated with this line. The Sequence field 1112 comprises a corresponding entry 1120 that identifies the sequence in which multiple cues for the line (if any) are to be performed. For example, FIG. 11 first lists cue 1 then lists cue 2. This indicates that cue 1 is to be performed before cue 2. Additional information can also be included such as the portion of the line at which each cue is to be performed. Also icons and colors for cues can be used in addition to cue numbers to differentiate between different types of cues, for example, sound and lighting cues.

In another embodiment, separate cue records 1102 can be maintained for multiple cues associated with a given line. In this embodiment, only a single Sequence field entry 1120 and Cue field entry 1122 is required for each cue. For example, a first cue record for a given line can include a Sequence field entry 1120 of "1", while, a second cue record for the line can include a Sequence field entry 1120 of "2". In this example, a lower sequence number or sequence indicator indicates that the associated cue is performed before a cue with a higher sequence number. It should be noted that other mechanisms for indicating the sequence of multiple cues for a given are also applicable as well. The Cue field 1114 comprises a corresponding entry 1122 for each cue (or a single cue) with text defining/describing the cue(s). For example, FIG. 11 shows that the value/attribute 1116 includes text for each of cue 1 and cue 2 that describes/defines the action to be performed for each cue. In embodiments where separate cue records 1102 are maintained for multiple line cues the Cue field 1114 only includes a single entry 1122.

FIG. 12 shows one example of a stage record 1202. Stage records 1202 maintain stage information that is utilized by the interactive blocking environment 102 to display a representation of a stage within an interface of the interactive environment 102. The blocking module 112 then displays blocking information on the displayed/generated stage. Each stage record 1202 can be stored within a separate table, a single table associated with the corresponding script 107 a single table comprising all stage records for all scripts, etc. The user can manually enter the stage record information and/or the interactive blocking environment 102 can automatically populate the record 1202 with the information discussed below.

In the example shown in FIG. 12, a stage record 1202 comprises a field column 1204 and a corresponding value/attribute column 1206. The field column 1204 comprises a "Script ID" field 1208, a "Stage ID" field 1210, and a "Stage Image" field 1212. It should be noted that additional field can be included as well, and one or more of the fields shown in FIG. 12 may be optional. The Script ID field 1208 comprises a corresponding entry 1214 under the value/attribute column 1204 that identifies the script 107 associated with the stage. The Stage ID field 1210 comprises an identifier(s) 1216 that uniquely identifies the stage(s) associated with the script 107.

The Stage Image field 1212 comprises a file(s) 1218, such as (but not limited to) an image file, or a link(s) to a file(s) that represents the stage(s). The blocking module 112 utilizes this file(s) to generate/display a stage in the interactive blocking environment 102. Also, executable computer program code can be stored within the Stage Image field 1210 (or another field) that when executed the blocking module 112 dynamically generates a stage within the interactive blocking environment 102. It should be noted, a script 107 can be associated with two or more stages. In this embodiment, either separate stage records are generated/maintained for each of these stages, or a single stage record is created/maintained that includes files, pointers to files, and/or executable code for each of these stages.

Also, a script is not required to be associated with a specific stage(s). Therefore, one or more default stage records can also be stored within the data 116 as well. Default stage records include default stage image files, pointers to default stage image files, and/or executable code, etc. for default stages. These default stages can be displayed in the interactive blocking environment 102 when a script 107 is not associated with a specific stage.

FIG. 13 shows one example of an actor record 1302 for storing information associated with one or more actors in the play/movie. In one embodiment, each actor in the play is associated with at least one actor record. Each actor record can be stored within a separate table, a single table associated with the corresponding script 107, a single table comprising all character records for all scripts, etc. The user can manually enter the actor record information and/or the interactive blocking environment 102 can automatically populate the record 1302 with the information discussed below.

In the example shown in FIG. 13, an actor record 1302 comprises a field column 1304 and a corresponding value/attribute column 1306. The field column 1304 comprises a "Script ID" field 1308, an "Actor Name" field 1310, a "Role" field 1312, and a "Contact Information" field 1314. It should be noted that additional fields can be included as well. Also, one or more of the fields shown in FIG. 13 may be optional. The Script ID field 1308 comprises a corresponding entry 1314 under the value/attribute column 1304 that identifies the script 107 comprising the character associated with the record 1302. The Actor Name field 1310 comprises a corresponding entry 1316 including the name of the actor. The Role field 1312 comprises a corresponding entry 1320 that identifies the character(s)/role(s) in the script that the actor is playing. Alternatively, entry 1320 can comprise a pointer/link to the character record 1002 associated with the character being played by the actor. The Contact Information field 1314 comprises corresponding entry 1322 including contact information associated with the actor. For example, this field can include a phone number(s), email address(es), street address(es), etc. for the actor. This information can then be used to distribute script updates or notes to the actors identified in 1302 via one or more options in interactive blocking environment 102. For example, notes may distributed to only specific actors, a group of actors, by roles i.e. ensemble 1, ensemble 2, low brass in the case of marching band, or by personal i.e. lighting or sound, or stage crew.

FIG. 14 shows one example of a performance record 1402 for storing/rehearsal information associated with the script/play. In one embodiment, each performance/rehearsal date is associated with a separate performance record. However, in other embodiments a single performance record is associated with multiple performance dates. Each performance record can be stored within a separate table, a single table associated with the corresponding script 107, a single table comprising all performance records for all scripts, etc. The user can manually enter the performance record information and/or the interactive blocking environment 102 can automatically populate the record 1402 with the information discussed below.

In the example shown in FIG. 14, a performance record 1402 comprises a field column 1404 and a corresponding value/attribute column 1406. The field column 1404 comprises a "Script ID" performance 1408, a "Performance Date" performance 1410, and a "Number of Performances" performance 1412. It should be noted that additional fields can be included as well. Also, one or more of the fields shown in FIG. 14 may be optional. The Script ID field 1408 comprises a corresponding entry 1414 under the value/attribute column 1404 that identifies the script 107 associated with the record 1402. The Performance Date field 1410 comprises a corresponding entry 1416 identifying the date(s) of the performance/rehearsal. The Number of Performances field 1412 comprises a corresponding entry 1418 identifying the number of performances/rehearsals to be performed on the performance date(s).

FIG. 15 shows one example of a notes record 1502 for storing notes associated with one or more actors for at least one line in a script 107. In one embodiment, notes records are maintained on a per line and per/rehearsal basis. However, in other embodiments, a single notes record can be associated with multiple lines, multiple performances/rehearsals, and/or multiple performance/rehearsal dates. Each notes record can be stored within a separate table, a single table associated with the corresponding script 107, a single table comprising all notes records for all scripts, etc. The user can manually enter the notes record information and/or the interactive blocking environment 102 can automatically populate the record 1502 with the information discussed below.

In the example shown in FIG. 15, a notes record 1502 comprises a field column 1504 and a corresponding value/attribute column 1506. The field column 1504 comprises a "Script ID" field 1508, a "Performance Date" field 1510, an "Actor" field 1512, a "Line ID" field 1514, and a "Comment" field 1516. It should be noted that additional fields can be included as well. Also, one or more of the fields shown in FIG. 15 may be optional. The Script ID field 1508 comprises a corresponding entry 1518 under the value/attribute column 1504 that identifies the script 107 associated with the record 1502. The Performance Date field 1510 comprises a corresponding entry 1520 identifying the date(s) of a given performance or a link/pointer to a performance record.

The Actor field 1512 comprises a corresponding entry 1522 identifying the actor associated with line in the script for which the notes record was created. This entry 1522 can either include the actor name and/or a link/pointer to the actor record 1302. The Line ID field 1514 comprises a corresponding entry 1524 identifying the line in the script for which the notes record was created. This entry 1524 can either include the actual line ID for the line and/or a link/pointer to the line record 902 associated with the line. The Comment field 1516 comprises a corresponding entry 1526 including various notes entered by a director, stage manager, etc. for the given line. It should be noted that these comments are not limited to being entered during an actual performance. For example, comments can be entered during rehearsal, production, down-time, etc.

FIG. 16 shows one example of a blocking or positional information record 1602 for maintaining/storing blocking information. A blocking record 1602 is created/maintained for each blocking position (or a plurality of blocking positions) associated with a line in a script 107. Each of these blocking records can be stored within a separate table, a single table associated with the corresponding script 107, a single table comprising all blocking records for all scripts, etc. The user can manually enter the blocking record information and/or the interactive blocking environment 102 can automatically populate the record with the information discussed below.

In the example shown in FIG. 16, a blocking record 1602 comprises a field column 1604 and a corresponding value/attribute column 1606. The field column 1604 comprises a "Script ID" field 1608, a "Line ID" field 1610, a "Sequence" field 1612, a "Character" field 1614, a "Stage ID" field 1616, an "Xpos" field 1618, and a "Ypos" field 1620. It should be noted that additional fields can be included as well. Also, one or more of the fields shown in FIG. 16 may be optional. The Script ID field 1608 comprises a corresponding entry 1622 under the value/attribute column 1606 that identifies the script associated with the record 1602. The Line ID field 1610 comprises a corresponding entry 1624 identifying the line in the script 107 associated with the blocking record 1602. This entry 1624 can either include the actual line ID for the line and/or a link/pointer to the line record 902 associated with the line.

The Sequence field 1612 comprises a corresponding entry 1626 that identifies the sequence in which multiple blocking positions for the line are to be displayed. In one embodiment, separate blocking records are maintained for multiple blockings associated with a given line. In this embodiment, only a single Sequence field entry 1626 is required to be stored within the record 1602. For example, a first blocking record for a given line can include a Sequence field entry 1626 of "1", while, a second blocking record for the line can include a Sequence field entry 1620 of "2". In this embodiment, a lower sequence number indicates that the associated blocking occurs before a blocking with a higher sequence number. It should be noted that other mechanisms for indicating the sequence of multiple blockings for a given line are applicable as well.

In another embodiment, a single blocking record 1602 can be maintained for all blocking positions associated with a given line. In this embodiment, the Sequence field 1612 includes multiple entries 1626 identifying each blocking position for the line along with their sequencing numbers. Additional information such as the portion (e.g., word, sentence, etc.) of the line or the location within the line where each of these blocking positions corresponds to can also be included within the Sequencing field 1612 as well. It should be noted that if the line is only associated with a single blocking position then the Sequence field 1612 is not required or can be left blank.

The Character field 1614 comprises a corresponding entry 1628 identifying the character(s) associated with the blocking information in the blocking record 1602. In one embodiment, this entry 1628 is a pointer to a separate character record 1002 discussed above with respect to FIG. 10. The Stage ID field 1616 comprises a corresponding entry 1630 identifying the stage(s) associated with the blocking information. This stage is to be displayed in the interactive blocking environment 102, as discussed in greater detail below. In one embodiment, the Stage ID entry 1630 points to the stage record(s) 1202 associated with the stage(s).

The Xpos and Ypos fields 1618, 1620 each comprises a corresponding entry 1632, 1634 identifying the respective x-position and y-position on the stage at which the avatar associated with the character identified in the Character field 1614 is to be displayed on the stage. In one embodiment, the x and y positions 1632, 1634 correspond to pixels and/or coordinates of the displayed stage image. However, other positioning/location information is applicable as well. If multiple blocking positions are maintained within the record 1602, x-position and y-position data is maintained for each of these blocking positions within the Xpos and Ypos fields 1618, 1620. The information discussed above with respect to FIG. 9-16 is utilized by the interactive blocking environment 102 to present blocking and cue information to a user in the interactive blocking environment 102. The stage image may include optional dimensions or markers to help with the blocking process not shown.

Figure 17:
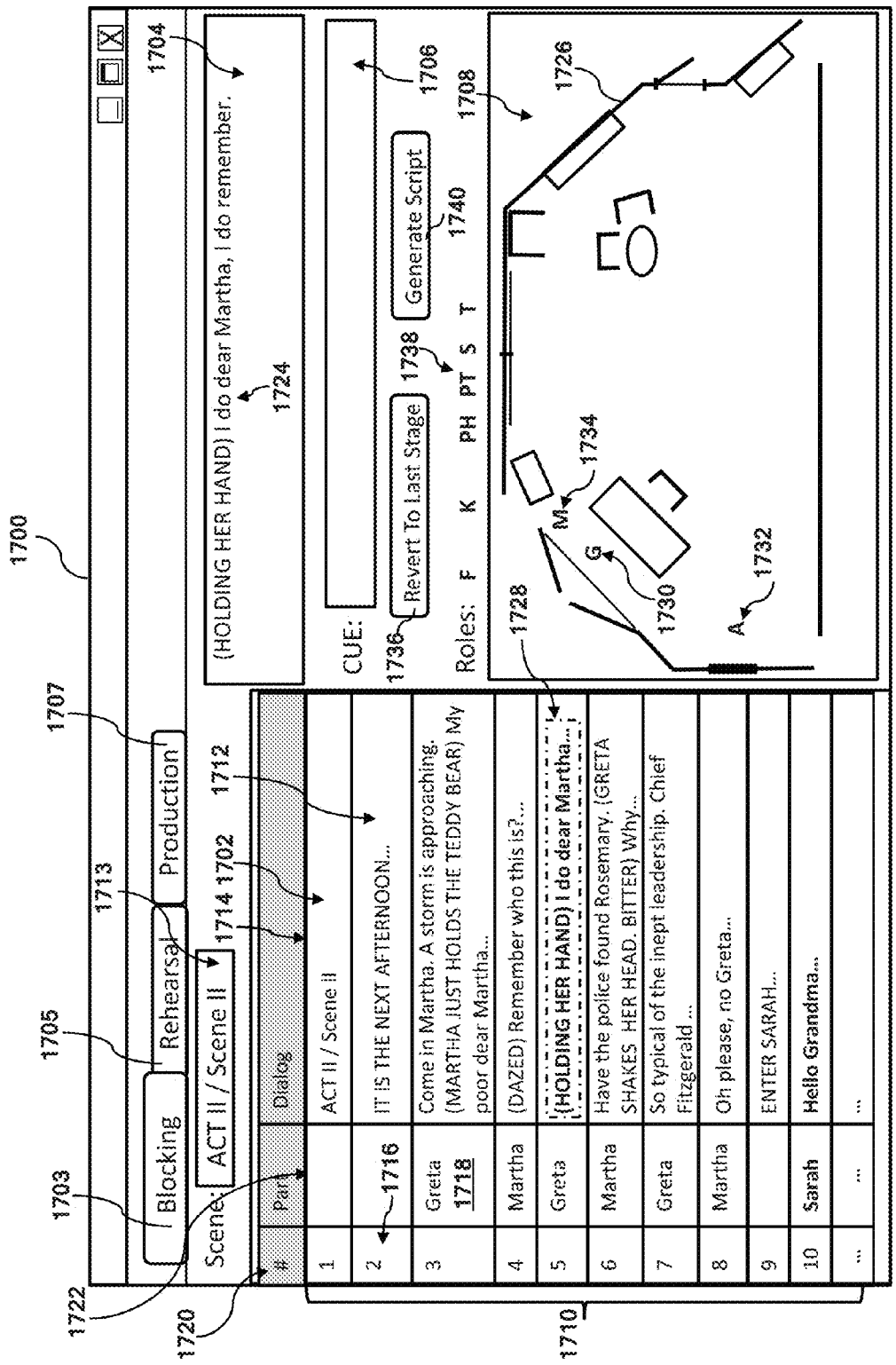
FIG. 17 shows one example of an interface for providing blocking information to a user according to one embodiment of the present invention.

FIG. 17 shows one example of an interface 1700 such as (but not limited to) a window presented by interactive blocking environment 102 that allows a user such as (but not limited to) a director or an actor to view, enter, and/or update blocking/cue information for a given script 107. In one embodiment, the interface 1700 allows the user to select from multiple views. For example, FIG. 17 shows that a "Blocking" tab 1703, a "Rehearsal" tab 1705, and a "Production" tab 1707. Each of these tabs 1703, 1705, 1707 presents a different view when selected. It should be noted that the interface 1700 is not limited to providing these viewing options via tabs, and other mechanisms for presenting the user with viewing options are applicable as well. In other embodiments, different views or configurations of the interface 1700 are displayed to the user based on the permissions associated with a user. For example, a director may have permission to interact with each of the Blocking, Rehearsal, and Production views of the interface 1700, while an actor may only have permission to interact with the Blocking view. Also, a viewing option may be configured differently for different users. For example, the Blocking view of the interface 1700 presented to a director may be different than the Blocking view presented to an actor.

FIG. 17 shows one example of the Blocking view of the interface 1700. In this embodiment, the interface 1700 comprises a script region 1702, a line editing region 1704, a cue region 1706, and a blocking region 1708. It should be noted that one or more of these regions may be optional. It should also be noted that two or more of these regions may be combined into a single region. Also, one or more of these regions may be displayed in a separate window or interface. Each of these regions 1702, 1704, 1706, 1708 is discussed in greater detail below.

In the example shown in FIG. 17 at least a portion 1710 of a script 107 is displayed to the user in the script region 1702. It should be noted that the script can be manually selected by the user or automatically selected by the interactive blocking environment 102. FIG. 17 shows that one or more lines 1712 (including stage directions, queues, etc.) from the selected script 107 are displayed to the user in the script region 1702 under a first column 1714. These lines 1712 can be from the entire script 107 or from a given portion of the script 107. For example, in one embodiment, the interactive blocking environment 102 presents a display option 1713 to the user, which allows a user to select which scenes, acts, etc. to display lines 1712 from. In the example shown in FIG. 17, the user has selected "Act II/Scene II" resulting in lines 1712 from Act II/Scene II of the script 107 being displayed to the user. It should be noted that if only a portion 1710 of the script 107 is being displayed the user is able to perform one or more options such as scrolling, paging, etc. to bring additional portions of the script 107 into view.

In one embodiment, the script presentation module 104 (or the blocking module 112) utilizes the line records 902 and optionally the character records 1002 to display the lines 1712 in the script region 902. For example, upon selection of the script 107 the script presentation module 104 (or the blocking module 112) identifies each line record associated with the script 107 based on the script ID of the script 107. If a specific portion of the script 107 was selected such as a given scene and/or act, the script presentation module 104 (or the blocking module 112) identifies line records 902 and optionally the character records 1002 for the lines associated with that specific portion of the script 107. The script presentation module 104 (or the blocking module 112) then utilizes the information within these records 902, 1002 to display lines 1712 and any associated information within the script region 902.

For example, based on the information within the line and character records 902, 1002 the script presentation module 104 (or the blocking module 112) displays line ID information 1716 and character (role/part) information 1718 for each line being displayed to the user in the script region 902. In one embodiment, the line ID information 1716 and character information 1718 are displayed under separate columns 1720, 1722 within the region 1702. However, it should be noted that the lines 1710, line ID information 1716, and/or the character information 1718 can be displayed within a single column as well.

In addition to viewing lines 1712 from the script 107 the user can also edit the lines 1712 as well. For example, when one or more lines 1712 have been selected in the script region 1702, either by the user or by the interactive blocking environment 102, the corresponding text 1724 is displayed in the editing region 1704. The user is then able to edit the lines, stage directions, and/or the like. For example, a director may want to remove certain words from the script based on the audience or forum. In addition to editing lines, the user can also make changes to characters/roles. For example, an original male character may be changed to a female character, and vice versa. When the text of a line is edited the corresponding line record 902 is updated with the changes. In one embodiment, different users are associated with different permissions with respect to editing script content. For example, a director can be allowed to edit script lines, stage directions, etc., while an actor may be prohibited from making any changes. In another embodiment, a director may only be able to edit stage directions if he/she does not have permission to make changes to the script lines.

Also, the interface 1700, in one embodiment, comprises an option (not shown) that when selected by the user sends an updated script comprising any changes made via the editing region 1704 to one or more recipients. For example, after the user makes one or more changes to the script he/she can select a widget, menu item, etc. within the interface 1700 (or another part of the interactive environment) for sending an updated script to one or more recipients. In one embodiment, the user can manually select the recipients such as (but not limited to) one or more of the actors of the updated script, and/or the interactive blocking environment 102 can automatically select one or more of the recipients based on the data 116. For example, the interactive blocking environment 102 can identify one or more actors from the actor records 1302 and automatically select these actors as the recipients. In this embodiment where the recipients are one or more of the actors, the interactive environment utilizes the contact information from the actor records 1302 to send the updated script to the recipients. The user can also select the publisher of the script as a recipient. This allows the publisher to receive a modified script for approval of the changes and/or request for additional fee payment for the changes.

In one embodiment, the user can also create and/or edit cues associated with a given line(s) 1712. For example, when one or more lines 1712 have been selected in the script region 1702, either by the user or by the interactive blocking environment 102, any associated cues are displayed in the cue region 1709 via the cue module 114. For example, the cue module 114 determines if any cue records 1102 exist for the selected record(s) based on, for example, the script ID and Line ID information stored within the cue records 1102. If a cue record(s) exists for the selected line(s), the cue record 114 extracts the cue text from the cue record 1102 and presents this text within the cue region 1706 of the interface 1700. The user is able to edit or delete these cues similar to the process for editing lines discussed above. The cue record 1102 is then updated with any changes made by the user to the cue. In addition, the user can also enter a cue into the cue region 1706 for association with one or more selected lines 908. A new cue record 1102 is then created for the selected line(s).

The blocking region 1708 of the interface 1700 displays blocking information for each selected line 1712. In one embodiment, when script 107 has been selected the blocking module 112 identifies one or more stages associated with the script 107 based on the stage record(s) 1202 associated therewith. The blocking module 112 generates/displays a representation of a stage 1726 in the blocking region 1708 based on the information within the identified stage record(s) 1202. For example, if the stage record 1202 includes an image file (or a link to an image file) for a stage the blocking module 112 displays the image from the image file within the blocking region 1708. Alternatively, if the stage record 1202 includes executable code such as (but not limited to) a script the blocking module 112 executes the script to dynamically generate a representation of a stage within the blocking region 1708. If multiple stage records 1202 are associated with the script 107, the user can be prompted to select one of the stages for display.

Alternatively, two or more of these stages can be displayed at the same time in the interface(s) 1700. If a stage record 1202 is not associated with the script 107 a default/ generic stage can be displayed. In one embodiment, the displayed stage 1726 can be represented in a variety of ways. For example, a photograph of the actual stage may be displayed; a line drawing of the stage can be displayed/generated; etc. A stage 1726 displayed within the blocking region 1708 can show entrances, set pieces/props, room dividers, or any other item associated with a stage.

The blocking module 112 utilizes the blocking region 1708 and the displayed stage(s) 1726 to display blocking information for one or more lines 1712 in the script 107. For example, as the user or script presentation module 104 selects/identifies a line 1712 in the script region 1702 the blocking module 112 indicates where the actor/character associated with the line(s) 1712 should be located on the stage 1726. FIG. 17 shows one example, where the fifth line 1728 in the script region 1702 has been selected, as indicated by the dashed box.

The blocking module 112 determines if any blocking information is associated with the selected line 1728 based on the script and blocking data 116 discussed above. If so, the blocking module 112 presents blocking information on the displayed stage 1726 as shown in FIG. 17. For example, FIG. 17 shows that avatar "G" 1730 representing the character Greta who is to recite selected line 1728 has been displayed on the stage 1726 at a given location. This location indicates to the user where the actor playing Greta is to be positioned on the stage during the line 1728. The blocking module 112 can also indicate where one or more other actors/characters such as ensemble actors/characters should be located on the stage 1726 during the selected line(s) 1728. For example, FIG. 17 shows that an avatar "A" 1732 representing the character Aaron is displayed at a location on the stage 1728 while the actor playing Greta is reciting the selected lines 1728. FIG. 17 also shows an avatar "M" 1734 representing the character Martha is displayed at a location on the stage 1728 as well.

In one embodiment, any dialog lines that are associated with blocking information such as a specific position/location change on the stage 1726 are distinguished from lines without blocking information. For example, FIG. 17 shows that lines 2, 5 and 10 are displayed in a visually different manner than dialog lines 3, 4, 6, 7, and 8. In the example of FIG. 17 lines 2, 5 and 10 have been bolded whereas lines 3, 4, 6, 7, and 8 have not. It should be noted that any mechanism for distinguishing between lines with and without blocking information is applicable.

In addition to viewing blocking information a user can also enter and/or update blocking information via the interface 1700. For example, a user is able to select an avatar displayed on the stage 1726 and either move this avatar to a new position or delete this avatar from the stage 1726. The blocking module 112 then updates the blocking record 1602 for the selected line based on the changes made by the user. Also, the user can select a widget(s) 1736 or an action(s) from a menu that clears all avatars from the stage 1726 and/or reverts the stage 1726 to its previous state for the selected line.

Additionally, the user can add an avatar to the stage 1726 for a selected line 1728. For example, in one embodiment, a legend 1738 comprising avatars for each character in the play (or portion (Act, scene, etc.) of the script 107) is displayed to the user in the interface 1700. The user can select one or more of these avatars from the legend 1738 and place them onto the stage 1726 at a given location. The blocking record 1702 for the line is then updated accordingly or a new blocking record is created. It should be noted that, in one embodiment, different users are associated with different permissions with respect to editing blocking information. For example, a director can be allowed to edit/add blocking information, while an actor may be prohibited from making any changes.

The interactive environment 102, in one embodiment, also allows the user to generate the script 107 with any changes made to the lines along with blocking information. For example, in this embodiment, a widget 1740 and/or a menu action is presented to a user that when selected generates a script file. In another embodiment, the interface view can be changed or a new window can be displayed that presents various options to the user for generating the script. For example, the user can change font size and type, add a footer or header to the script, etc. An option can also be presented that allows the user to change the perspective of a displayed stage comprising blocking information. For example, FIG. 18 shows a stage 1806 that has been displayed according to an audience perspective, while stage 1810 has been displayed according to an actor perspective or more generally, a performer's perspective. The user is able to select from a plurality of different perspective, and either have all the displayed stages oriented according to a single perspective or have two or more stages oriented in different perspectives.

The generated script file comprises each line of the script (or at least for a selected portion of the script, e.g., a given Act, scene, etc.), the character associated with the line, and any associated blocking information for the lines. The blocking information, in one embodiment, includes the stage associated with a given performance of play and blocking positions for each character. For example, FIG. 18 shows one example of a page 1800 from the generated script file. In the example shown in FIG. 18, the page 1800 comprises a plurality of lines 1802, the character 1804 associated with each line (if applicable), and a stage 1806 displayed next to a corresponding line comprising blocking information. For example, FIG. 18 shows a stage 1806 displayed next to the line 1808. The stage 1806 displays the position 1808 at which the actor playing the character associated with the line is to be located on the stage 1806. The stage 1806 also shows the locations of any ensemble actors, as discussed above.

Figure 19:
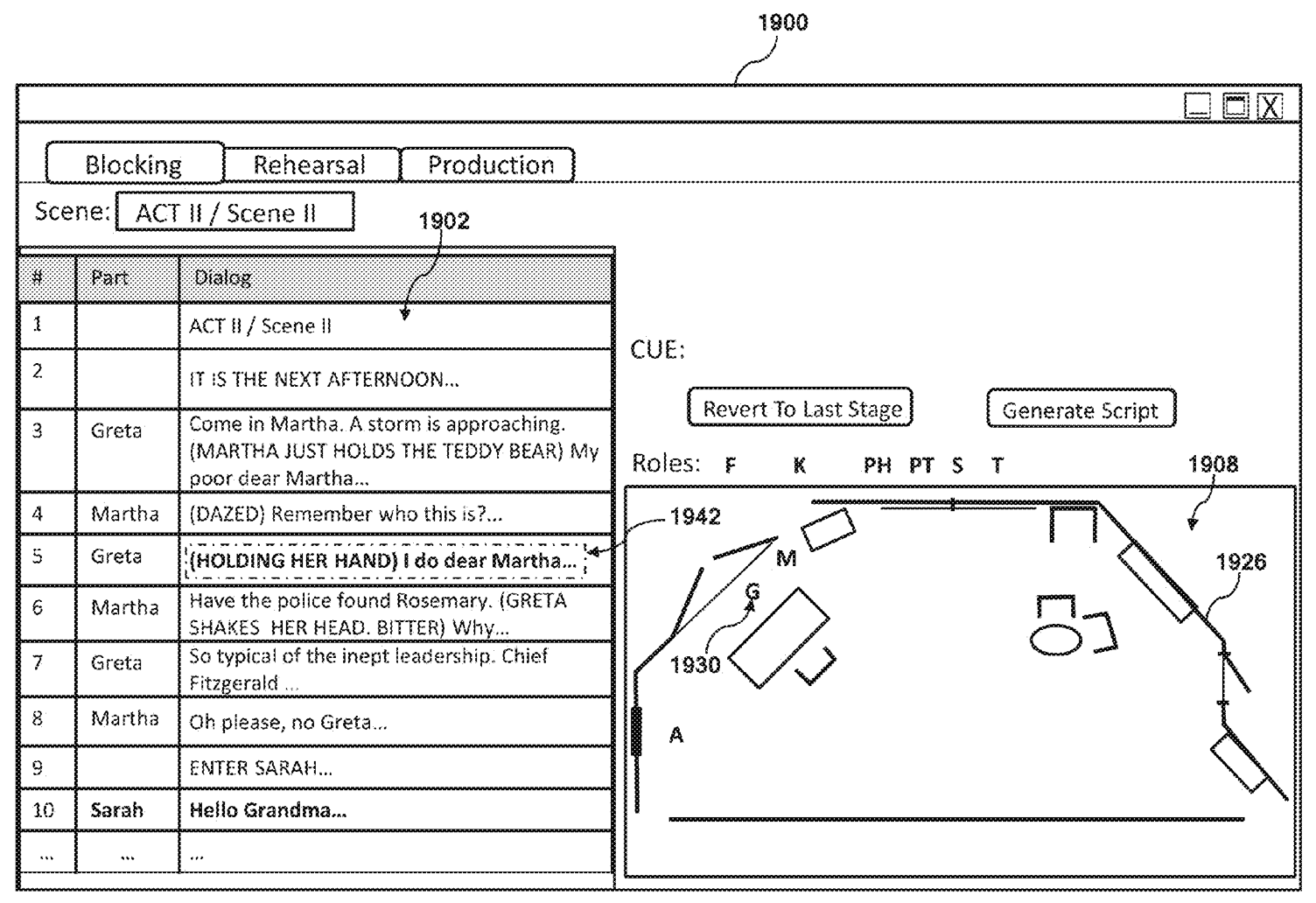

A more detailed discussion is now given with respect to displaying blocking information in the interactive blocking environment 102. FIG. 19 shows another example of an interface 1900 presented by the interactive blocking environment 102. In this embodiment, the interface 1900 is presented to a user such as an actor. Therefore, the interface 1900 does not allow the user to make any changes to script and blocking information 116. However, in other embodiments, the interface 1700 of FIG. 17 can be displayed to an actor as well.

In the example shown in FIG. 19 the script presentation module 102 has displayed a selected script 107 in the script region 1902. The user has selected line 5 in the script region 1902, as indicated by the dashed box 1942 surrounding the line. The blocking module 112 detects this selection and analyzes the script and blocking data 116 to determine if any blocking information is associated with the selected line. For example, the blocking module 112 searches the data 116 to identify blocking records 1602 comprising the script ID associated with the selected script 107.

The blocking module 112 analyzes the identified blocking records 1602 to determine if the selected line is associated with a blocking record(s). For example, the blocking module 112 identifies the line identifier (e.g., Line 5) of the selected line and searches for a blocking record 1062 comprising this line ID. If a blocking record having this line ID is not found this indicates that the actor is to remain at his/her current position, is speaking off stage, etc. Therefore, the blocking module 112 does not display an avatar on the stage 1926 in the blocking region 1908 for the character associated with the line, or maintains the previous position of a displayed avatar on the stage 1908.

In the current example, the blocking module 112 has identified a blocking record 1602 associated with the selected line. The blocking module 112 analyzes this record 1602 to identify the character associated with the line. For example, the blocking module 112 analyzes the blocking record 1602 of FIG. 1602 and identifies either the character or the pointer to a character record therefrom. The blocking module 112 retrieves the character record 1002 associated with the character, and identifies the avatar that is to be displayed for this character.

The blocking module 112 further analyzes the blocking record 1602 to identify the position/location on the displayed stage 1926 at which to display the identified avatar. For example, the blocking module 112 determines the x and y positions on the stage 1926 at which to display the avatar. The blocking module 112 then displays the avatar 1930 on the stage 1926 at this location. If any other characters need to be on stage while the actor is reciting the selected line then the same process discussed above is performed to identify any other avatars that are to be displayed on the stage 1926. It should be noted that, in one embodiment, the blocking module 112 maintains an avatar at a given location on the stage 1926 from line to line until a blocking record 1602 for a new line indicates that the avatar is to be located at a different position or not on the stage at all.

Figure 20:
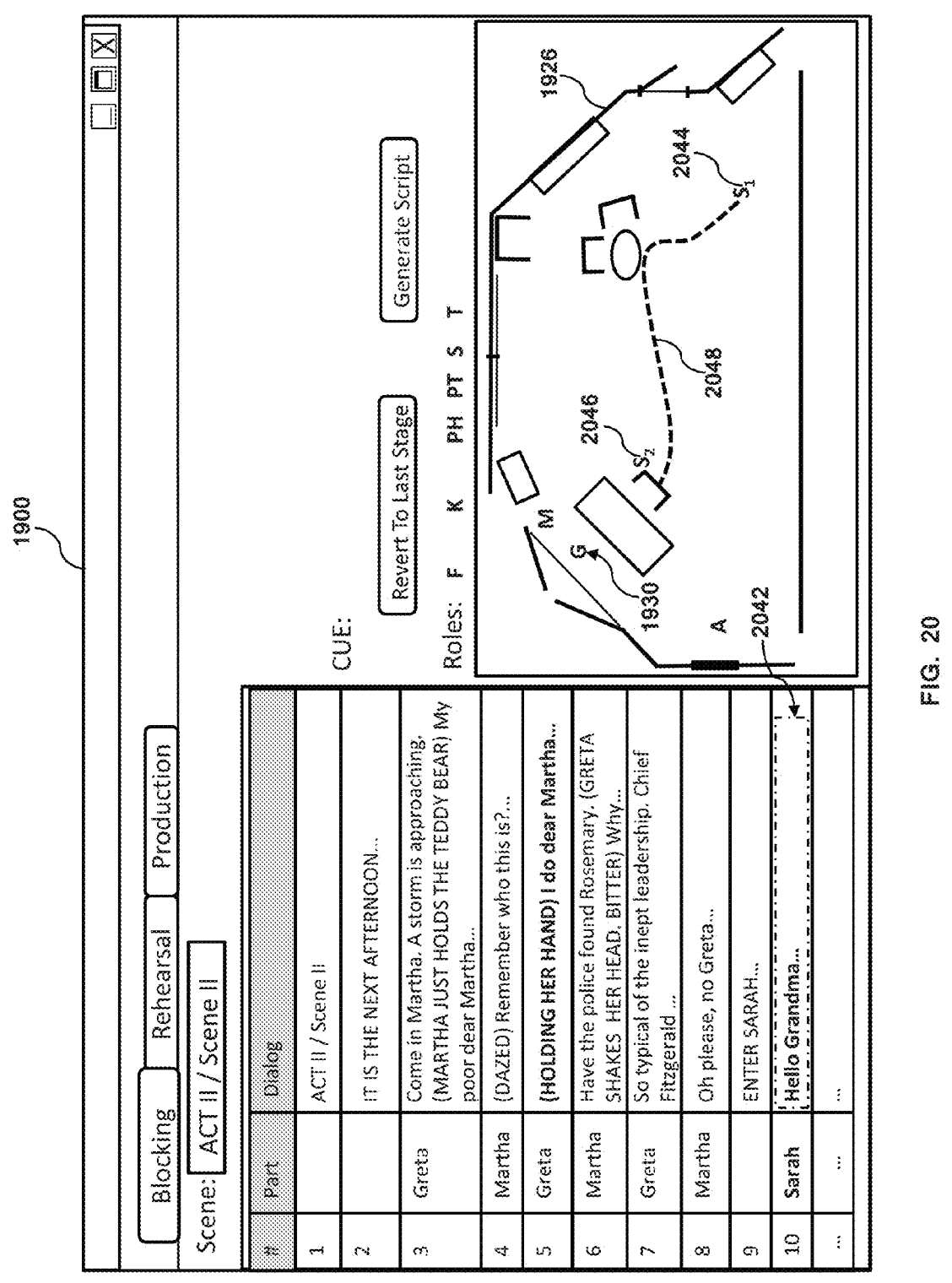

FIG. 20 shows that the user has selected another line, e.g. Line 10, in the script region as indicated by the dashed box 2042. The blocking module 112 performs the same process discussed above to identify any blocking information associated with the line. However, in this example the selected line is associated with multiple blocking positions for at least one character. In other words, the actor associated with the line needs to move from a first position to at least a second position. For example, FIG. 20 shows that two avatars "S$_1$" 2044 and "S$_2$" 2046 for the character Sarah have been displayed on the stage 1926. In this embodiment, each avatar 2044, 2046 is visually different from one another to help the user identify when he/she is to move from one position to the other. For example, the avatars 2044, 2046 can be different colors, different sizes, etc. In the example shown in FIG. 20 each avatar has a different subscript indicating a sequence as obtained from the blocking records 1602. However, any visual mechanism can be used to distinguish an avatar located at one position from the same avatar located at another position.

In one embodiment, the visual alteration of multiple instances of the same avatar on the stage 1926 corresponds to a visual alteration of the corresponding line. For example, lines associated with blocking information/records can be visually altered to indicate they are associated with blocking information/records. When a line is associated with two or more blocking positions the line can have multiple visual effects applied thereto to indicate which portion of the line is associated with which blocking position. Therefore, the visual alteration of multiple instances of an avatar can correspond to the visual alteration of different portions of the line to indicating which portion of the line a given avatar and its position correspond to. For example, a first portion of the line associated with a first position on the stage 1926 can be visually altered with the first subscript corresponding to the first instance of the avatar, while at least second portion of the line associated with at least a second position on the stage 1926 can be visually altered with the second subscript corresponding to the second instance of the avatar. Therefore, the actor knows that he/she is to be positioned at the first location on the stage 1926 for the first portion of the line and then transition to the second position on the stage 1926 for the second portion of the line.

In another embodiment, a first portion of the line associated with a first position on the stage 1926 can be visually altered with a first color, while at least second portion of the line associated with at least a second position on the stage 1926 can be visually altered with at least a second color. Therefore, the actor knows that he/she is to be positioned at the first location on the stage 1926 for the first portion of the line and then transition to the second position on the stage 1926 for the second portion of the line. A first instance of the avatar can be visually altered with the first color to indicate that the actor is to be located at this location on the stage 1926 for the first portion of the line. The second instance of the avatar can be visually altered with the second color to indicate that the actor is to be located at this location on the stage 1926 for the second portion of the line.

In yet a further embodiment, multiple stages 1926 can be displayed to a user with each stage displaying a separate position. For example, if Greta is required to move from a first location to a second location during line 5 a first stage can be displayed in the interface 1900 with the avatar "G" at a first position corresponding to the first location. A second stage (not shown) can also be displayed in the interface 1900 with the avatar "G" at a second position corresponding to the second location. These multiple stages can be displayed simultaneously within the interface 1900 or at different times. For example, tabs or some other mechanism can be utilized so that the user can individually select each of these stages for display.

In some situations an actor may not only be required to transition to/from multiple positions on the stage 1926, but also may be required to take a specific path from one position to another position. Therefore, one or more embodiments also display path information between two or more positions on the stage 1926. It should be noted that this path information can be for a transition between multiple positions for the same line or for different lines. Path information, in one embodiment, can be stored within the blocking records 1602. For example, multiple x/y position entries can be added in the Xpos and Ypos fields 1618, 1620 between the x/y coordinates associated with each location. The blocking module 112 utilizes these additional coordinates to display/generate a path or path indicator on the stage 1926 between positions. For example, FIG. 20 shows that a path 2048 has been displayed between position 1 and position 2 for avatar "S". Therefore, a user can be visually informed of a specific path that he/she is required to take when transitioning from one position to another. It should be noted that displaying path information on the stage 1926 is optional.

In one embodiment, the interface 1700 animates the movement of an avatar from one position to subsequent. For example, an animation option (not shown) can be presented to the user in the interface 1700. When selected, the blocking module 112 animates the movement of the avatar on the stage 1726. If the actor is required to follow a specific path, the animation shows the avatar following this path. The information in at least the blocking record 1600 can be utilized by the blocking module 112 to perform the animation. In another embodiment, as the user selects different lines 1728 in the interface 1700 the blocking module 112 animates any changes in blocking positions. For example, when a user selects a new line and an actor on stage needs to change his/her position from the previously selected line (or a new actor comes onto the stage) the blocking module 112 shows this movement by animating the movement of the corresponding avatar(s) to the new position on the displayed stage 1726.

Figure 21:
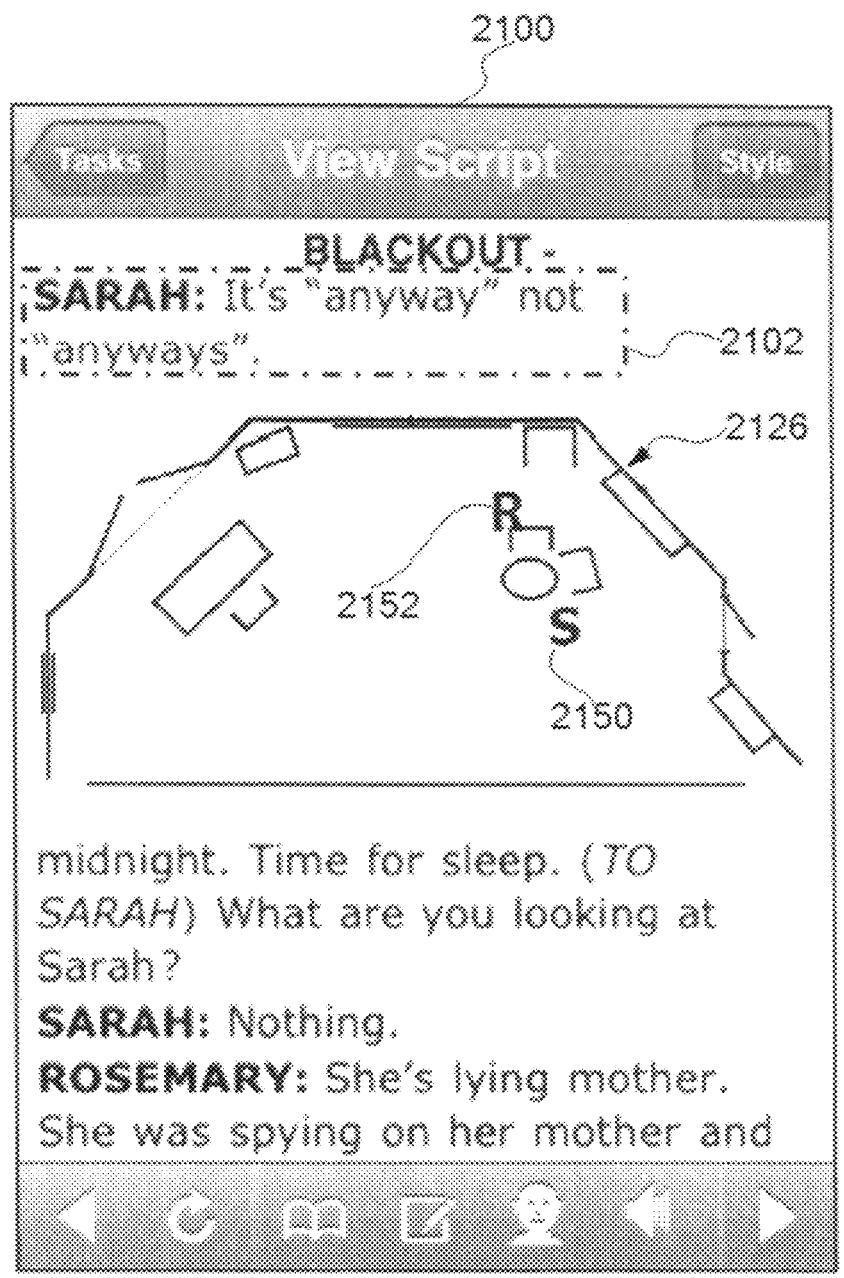
FIG. 21 shows yet another example of an interface for providing blocking information to a user according to one embodiment of the present invention.

It should be noted that blocking information is not limited to being displayed to a user via the interfaces of FIGS. 17-20. In one embodiment, the blocking information can be displayed to a user within the windows shown in FIGS. 3-8. For example, FIG. 21 shows one example of a window/interface 2100 such as those discussed above with respect to FIGS. 3-8. In this example, the user has selected a line, as indicated by the dashed box 2102. The blocking module 112 determines that the user has selected the line and displays any related blocking information, as discussed above, within the window. In particular, the blocking module 112 displays a stage 2126 within the window 2100 along with an avatar 2150 associated with the character of the selected line at a given position on the stage 2126. If any other actors are to be on stage during at this point in time the avatars 2152 for these actors are also displayed on the stage 2126 as well.

In addition to the blocking interface 1700, 1900, the users can also select different interfaces or different views of the interface 1700 such as a rehearsal interface and a production interface, as discussed above. For example, FIG. 22 shows an example of rehearsal view 2200 of the interface 1700. In the rehearsal view 2200, lines 2210 of a script 107 are displayed to the user in a script region 2202 similar to that discussed above with respect to FIG. 17. A role/character region 2254 displays each character associated with the selected script 107. However, in another embodiment, only the characters associated with the selected portion of the script 107 or a selected line are displayed in the role/character region 2254. In one embodiment, if a line is selected, the blocking module 112 identifies the character (from the associated line record 902) associated with the line and automatically selects the corresponding character in the role/character region.

A user is able to enter notes for a character/actor into a notes region 2256. For example, the user can select one or more of the displayed characters in the role/character region 2254. The user then enters text 2258 within the notes region 2256. The blocking module 112 stores the entered text 2258 into a notes record 1502 discussed above. Additional information such as performance date, actor ID, line ID, and/or the like can also be stored along with the note as well.

The user, in one embodiment, can also select one or more options (not shown) in the rehearsal view 2200 that allows the user to send the entered notes to the actor associated with the character. For example, the user can select an email option, a Short Message Service (SMS) option, a Multimedia Messaging Service (MMS) option, an instant messaging option, a social network messaging option) and/or any other messaging mechanism to send the note to the actor. The message, in one embodiment, includes at least the note and optionally the line ID associated with the note, the section (Act, Scene, etc.) of the script associated with the line, etc. Also, a different set of notes can be maintained for different rehearsals.

Figure 23:
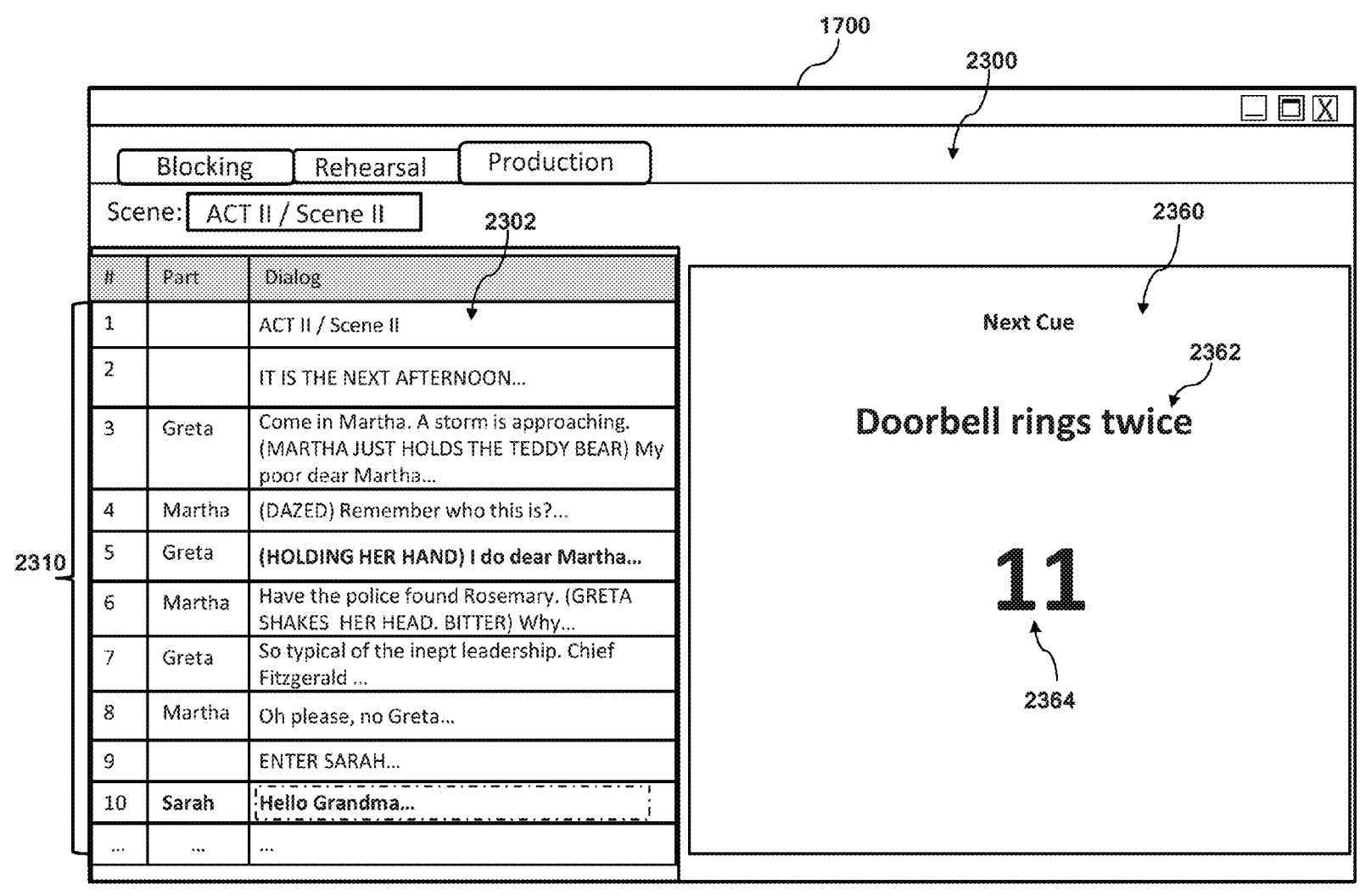

FIG. 23 shows yet another view 2300 of the interface 1700 corresponding to a production (i.e., live performance). In this view 2300, lines 2310 of a script 107 are displayed to the user in a script region 2302 similar to that discussed above with respect to FIGS. 17 and 29. A cue region 2360 displays each cue 2362 for the play. These cues 2362 inform the stage crew of the actions to perform for a given set of lines. For example, the cue region 2360 displays one or more cues from the cue records 1102 with respect to a selected line. For example, FIG. 23 shows that the user such as a stage crew member has selected line 10 in the script region 2302. The cue module 114 detects this selection and analyzes the cue records 1102 for the script 107. The cue module 114 then displays cue information 2362 such as "Doorbell rings twice" based on the identified cue record(s) 1102.

It should be noted that if the selected line is not associated with a specific cue record, the cue module 114 can identify the next line associated with a cue record 1102 and inform the user accord. For example, the cue module 114 can identify the next line associated with a cue to the user. Alternatively, the cue module 114 can indicate how many lines remain until a line associated with a cue occurs. For example, line 10 may not be associated with a specific cue, but line 11 is. Therefore, the cue module 114 displays the next cue in the cue region 2360 even though line 11 is selected. The cue region 2360 indicates the action to be performed (e.g., "Ring doorbell twice") by the stage crew for this cue and how many lines 2364 remain (e.g., 11 lines) until the cue is to be performed. In one embodiment, as selected lines becomes closer to the line at which the cue is to be performed, the number of lines remaining can be visually altered to indicate that an impending cue is to be performed.

Marching Band or Drum Corps

Figure 29:
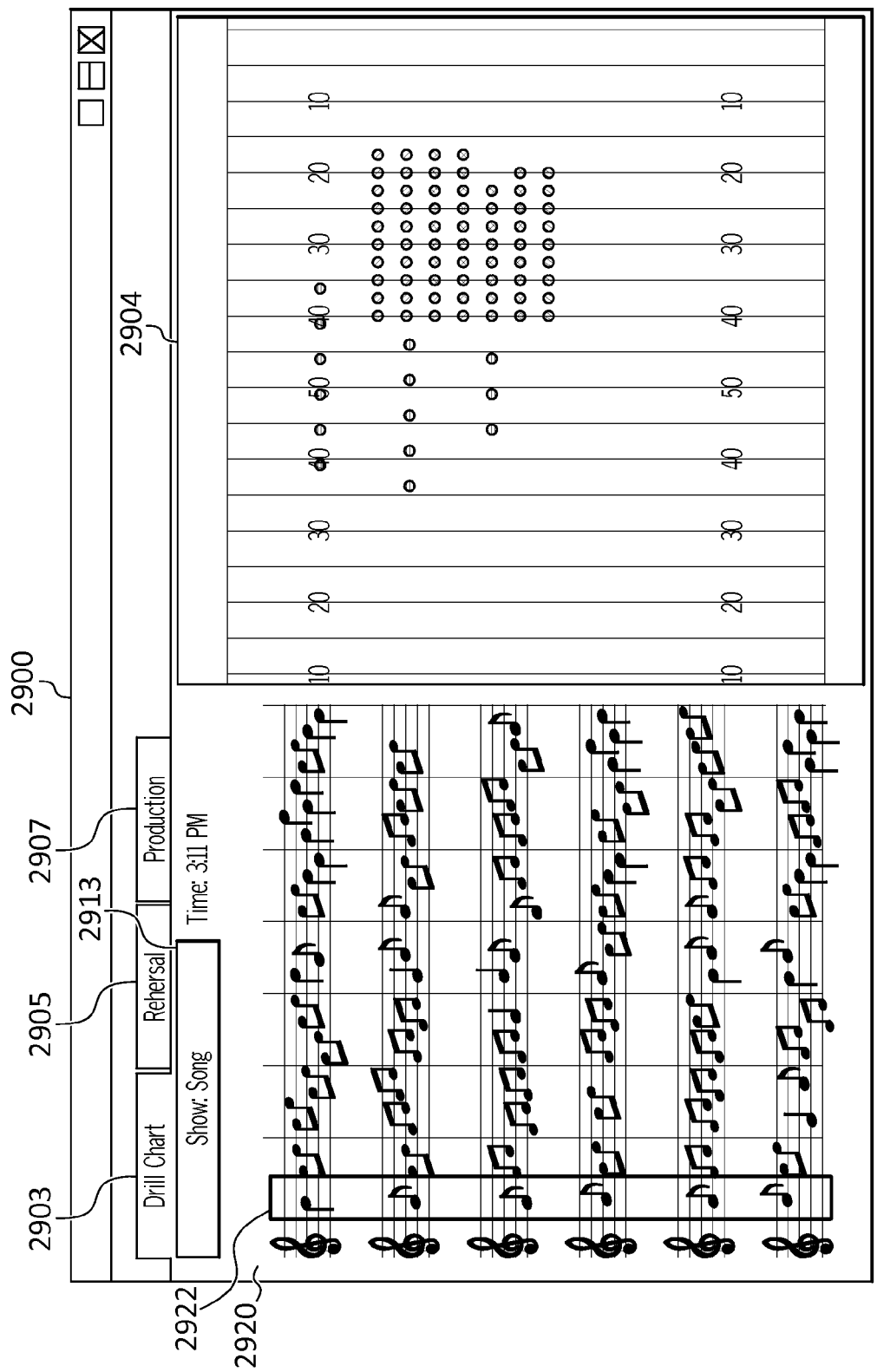
FIG. 29 shows one example of an interface for providing positional information to a user according to one embodiment of the present invention.

FIG. 29 illustrates one example of an interface 2900 such as (but not limited to) a window presented by interactive positional environment 102 that allows a user such as (but not limited to) a marching director or drum major or field commander to view, enter, and/or update positional information for a given musical score 2920. In one embodiment, the interface 2900 allows the user to select from multiple views. For example, FIG. 29 shows that a "Drill Chart" tab 2903, a "Rehearsal" tab 2905, and a "Production" tab 2907. Each of these tabs 2903, 2905, 2907 presents a different view when selected. It should be noted that the interface 2900 is not limited to providing these viewing options via tabs, and other mechanisms for presenting the user with viewing options are applicable as well. In other embodiments, different views or configurations of the interface 2900 are displayed to the user based on the permissions associated with a user. For example, a director may have permission to interact with each of the Drill Chart, Rehearsal, and Production views of the interface 2900, while an actor may only have permission to interact with the Blocking view. Also, a viewing option may be configured differently for different users. For example, the Drill Chart or Positional, or Blocking view of the interface 2900 presented to a marching band may be different than the Blocking view presented to a performer.

In this embodiment, the interface 2900 comprises a musical score region 2920 and a drill position region 2904. It should be noted that one or more of these regions may be optional. It should also be noted that two or more of these regions may be combined into a single region. Also, one or more of these regions may be displayed in a separate window or interface.

In the example shown in FIG. 29 at least a portion of a musical score is displayed to the user in the musical score region 2920. It should be noted that the musical score can be manually selected by the user or automatically selected by the interactive blocking environment 102. FIG. 29 shows that one or more staff lines from the selected musical score are displayed to the user in the musical score region 2902.

These scores lines can be from the entire musical score or from a given portion of the musical score e.g. low brass section. For example, in one embodiment, the interactive blocking environment 102 presents a display option 2913 to the user, which allows a user to select which show and song to display the musical score lines 2920 from. In the example shown in FIG. 29, the user has selected "Show 3/Song 1" resulting in the scores 2920 from Show 3/Song 1 of the musical score being displayed to the user. It should be noted that if only a portion of the musical score 2920 is being displayed the user is able to perform one or more options such as scrolling, paging, etc. to bring additional portions of the musical score 2902 into view.

It is important to note, that in this embodiment, a timing window 2922 is shown that corresponds to which note or group of notes in a musical score corresponds to a specific position of the drill chart 2904. As in the examples, above, the user can move individual or groups of icons representing members of a drill team or marching band to specific locations for a specific time interval of musical notes in the window 2922. Moreover, different portions of the marching band i.e. color guard versus musicians, props versus people, low brass versus flutes; can be shown in different colors or shapes as shown.

Figure 30A:
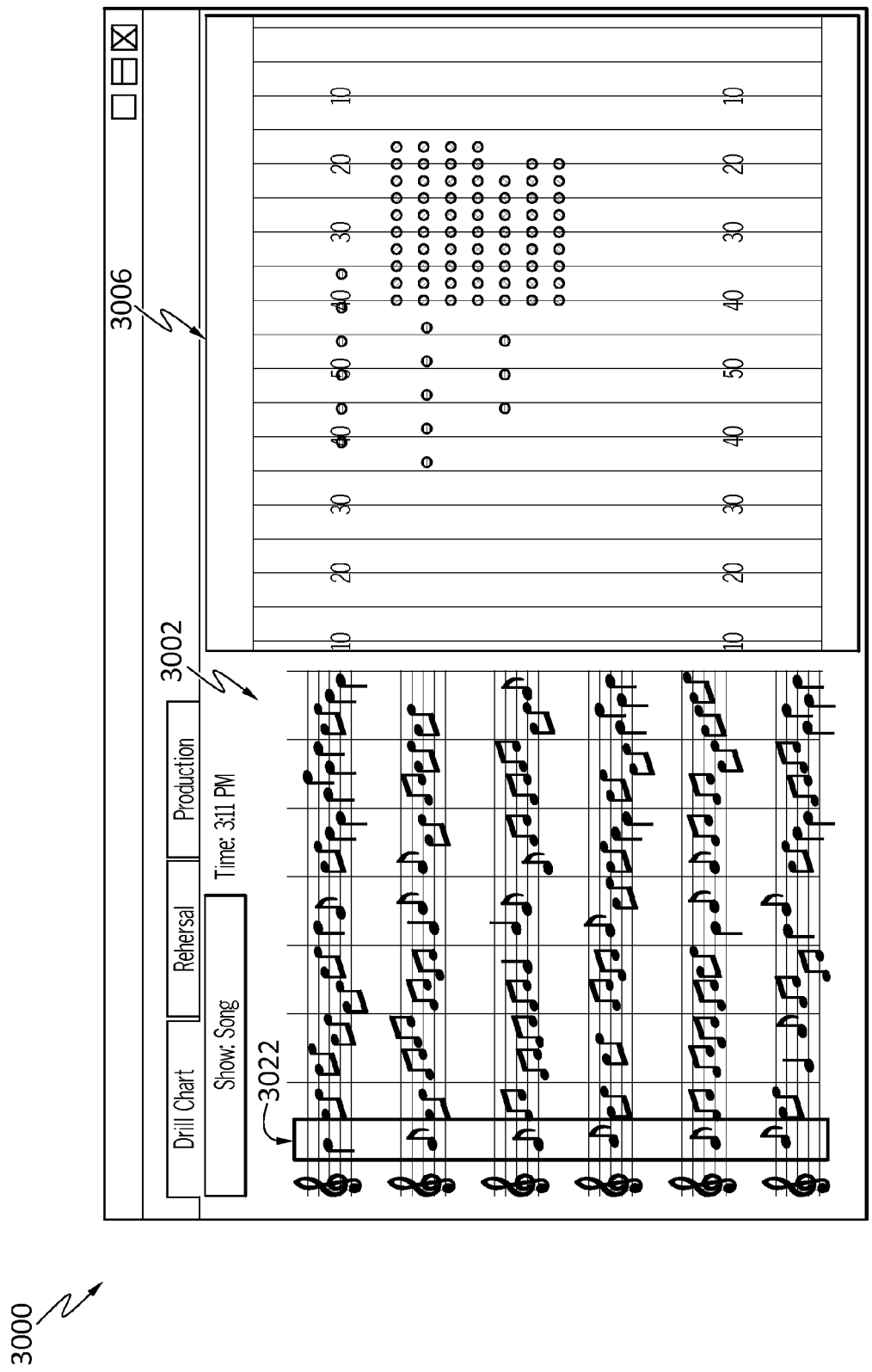
FIGS. 30A, 30B, 30C are another example of a page from a generated script comprising positional or blocking information according to one embodiment of the present invention.

As previously described for stages above in FIGS. 18-23, the interactive environment 102, in one embodiment, also allows the user to generate the musical 2920 with any changes made to the lines along with positional information. For example, in this embodiment, a widget and/or a menu action is presented to a user that when selected generates a musical script file. In another embodiment, the interface view can be changed or a new window can be displayed that presents various options to the user for generating the script. For example, the user can change font size and type, add a footer or header to the script, etc. An option can also be presented that allows the user to change the perspective of a displayed venue comprising positional information. For example, FIG. 30A shows a venue 3006 that has been displayed according to an audience perspective, while stage 3010 has been displayed according to a performer's perspective. The user is able to select from a plurality of different perspective, and either have all the displayed stages oriented according to a single perspective or have two or more venues or, stages oriented in different perspectives.

Figure 30B:
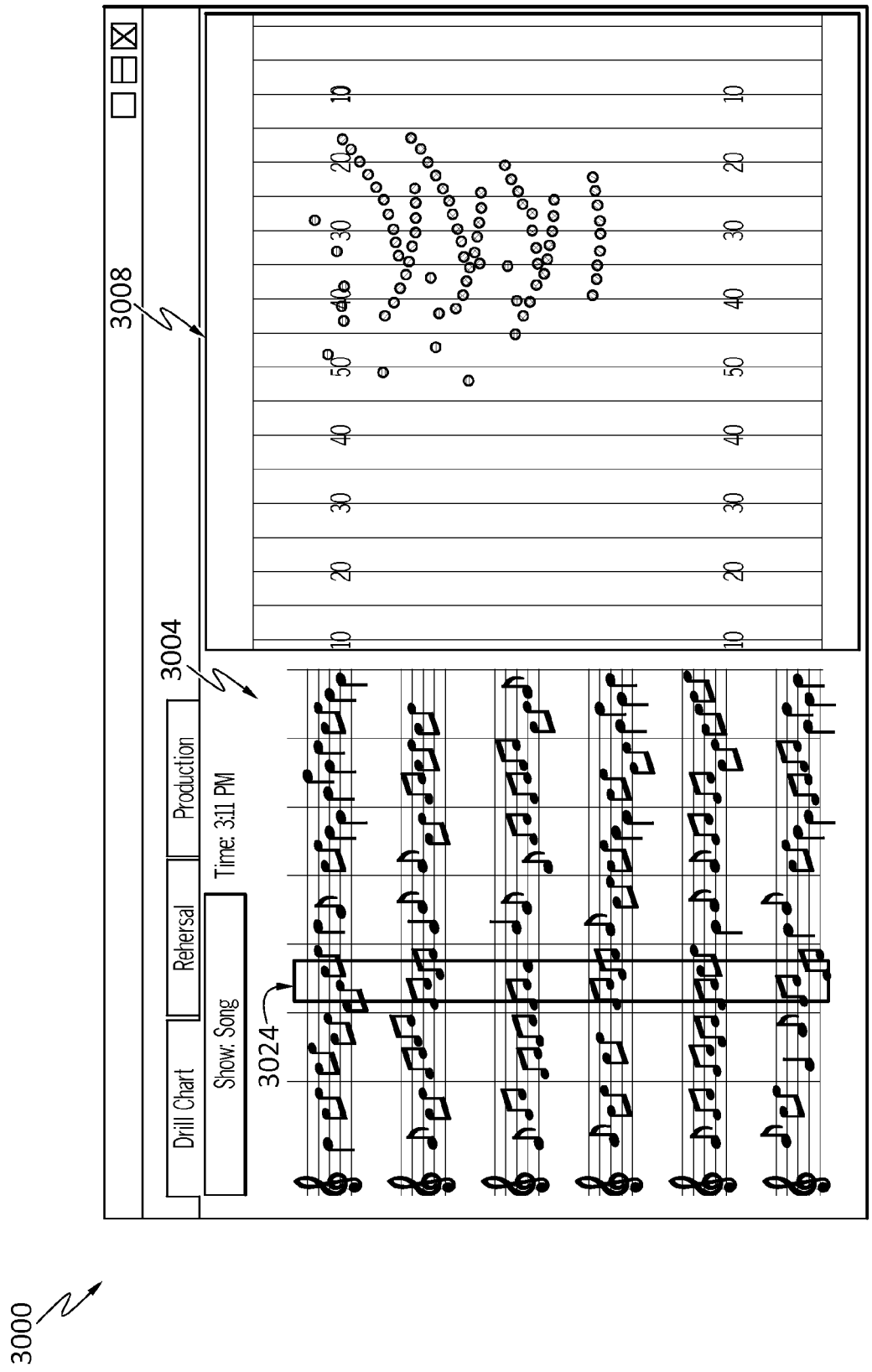
Figure 30C:
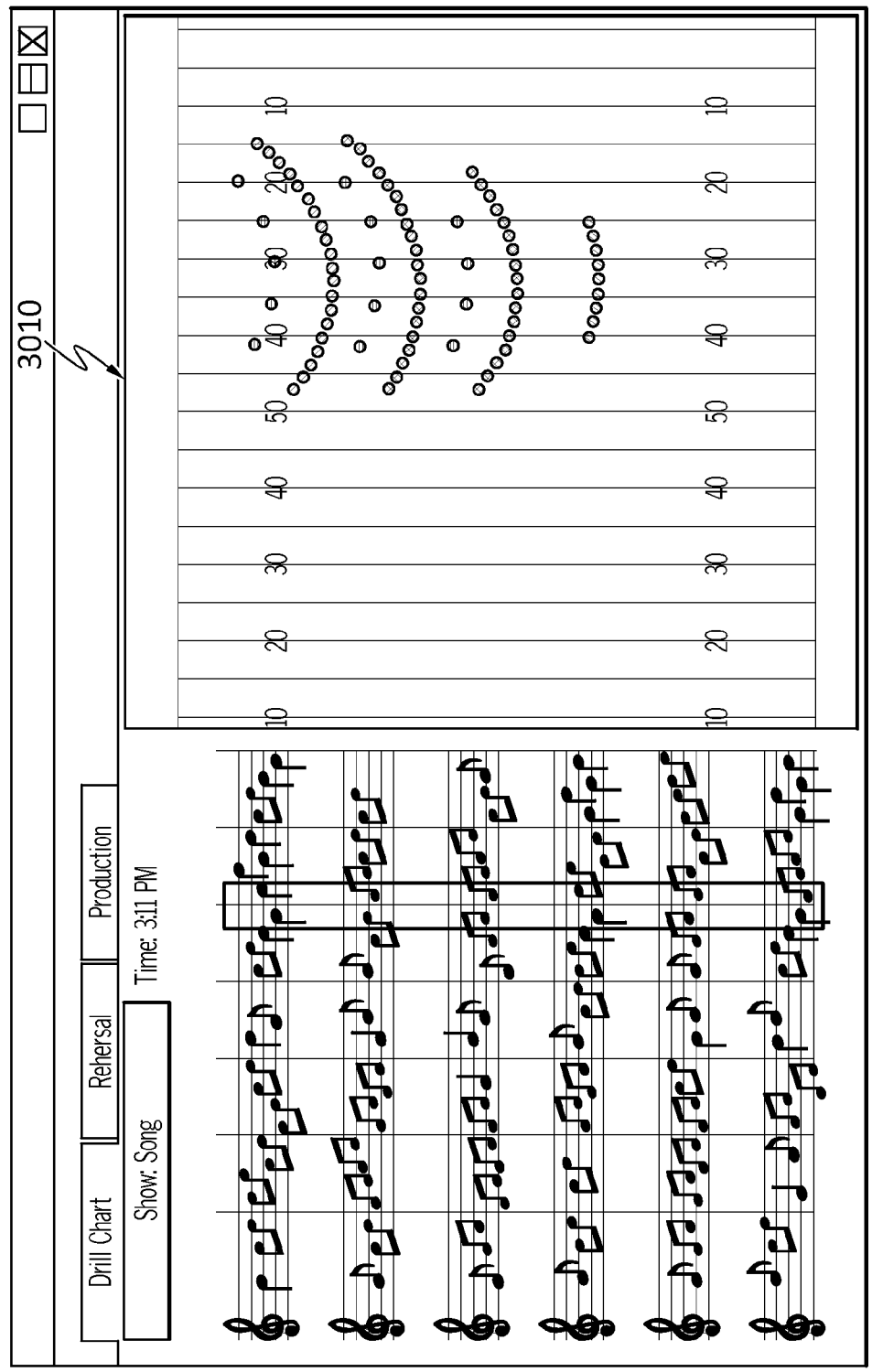

The generated script file comprises each group of notes of the musical script (or at least for a selected portion of the script, e.g., a given show and song, etc.). The positional information, in one embodiment, includes the venue associated with a given performance of marching band and positional positions for each performer. For example, FIG. 30A shows one example of a page 3000 from the generated script file. In the example shown in FIG. 30A, the page 3000 comprises a plurality of musical notes at a given time shown by window 3022, and a venue, in this case a football field 3006 with one or more of optional hash marks, sidelines, vertical hash marks and yard line number are displayed next to a corresponding line comprising blocking information. For example, FIG. 30A shows a field 3006 displayed next to the line musical score for a given time window 3922. As the musical note window progress in time from left-to-right 3022 to 3024 in FIG. A, FIG. 30B and FIG. 30C, the position which the performer associated with the musical line is to be located in the venue is updated.

Operational Flow Diagrams

Figure 24:
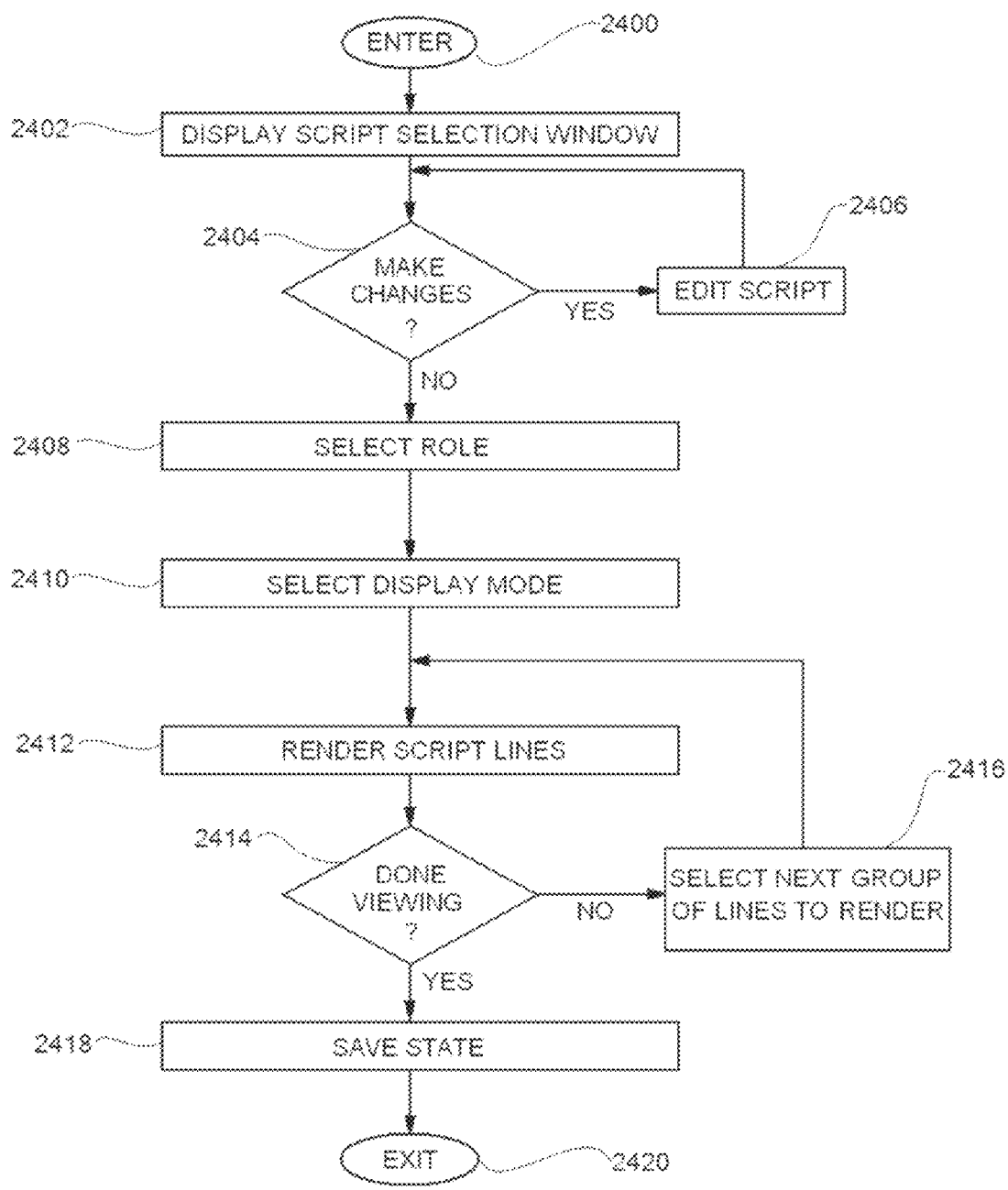
FIG. 24 is an operational flow diagram illustrating one example of a process for presenting a script to a user within an interactive blocking environment according to one embodiment of the present invention.

FIG. 24 is an operational flow diagram illustrating one example of presenting a script 107 to a user through an interactive blocking environment 102. The operational flow diagram of FIG. 24 begins at step 2400 and flows directly to step 2402. The script presentation module 104, at step 2402, presents a window to the user comprising available scripts 107 available for selection. The script presentation module 104 displays a selected script 107 to the user via the user interface 108 of the user device 100. It should be noted that, in one embodiment, there is no predefined format of the script 107. However, certain information about the non-digital scripts can be encapsulated in the format, as discussed above with respect to FIG. 2. For example, information such as which lines are dialog lines, the role associated with a dialog line, After the script 107 has been loaded, the script presentation module 104, at step 2404, determines whether the script 107 needs to be modified in any way. Here, the user can optionally request to edit the script 107 via the script editing module 106, thereby placing the interactive blocking environment 102 in an edit state. If the user has decided to make changes, an editing environment, at step 2406, is presented to the user. For example, a window is presented to the user that provides facilities for changing characteristics of the script 107 by changing, adding, or removing lines therefrom. In one example, each revision to a script is stored as a separate file, so that the user can review the "change history" of a script and return to the prior versions or even the original version if needed. In addition, the user can optionally add bookmarks to the script 107 and add audio files/recordings 109 to the script 107 to be played back as a part of the presentation process.

When the user chooses not to make changes, or alternatively has completed his changes the script presentation module 104 places the environment 102 into a presentation state for presenting the script 107 to the user. The script presentation module 104, at step 2408, receives the user's selection for a role that he/she wishes to study or learn. For example, the script presentation module 104 presents a selection window to the user that comprises a list of all the possible rolls (characters) in the script 107. The user selects one of these roles to be the active role in the presentation of the script 107. All other lines can be considered non-active. This active role is the part that the user is playing in the performing arts event. In some performing arts events the actor may play multiple roles. In this case the user is able to select more than one role at the same time to be considered the active role(s).

The script presentation module 104, at step 2410, prompts the user to select a presentation mode for the script 107. As discussed above, there are at least four primary modes that can be rendered, Scene mode, Line mode, Role mode, and Redacted mode. Once the user selects the presentation mode, the script presentation module 104, at step 2412, renders/presents the script lines appropriate for the selected mode on the user interface 108 of the user device 100. In one embodiment, the lines are displayed within a scrollable window allowing the user to view all the lines for that mode in the event that they are not all visible in the window. If audio is available for the lines being viewed, they can be played at this time as well.

The script presentation module 104, at step 2414, determines if the user has completed viewing the script 107. If the user has not completed viewing the script 107, the script presentation module 104, at step 2416, receives a selection from the user of another group of lines to view. The control flow then returns to step 2412 to render/present these lines. A few examples of the options available to the user for selection are: 1) the next sequential group of lines, 2) the group of lines previously viewed, 3) a bookmark in the script that allows the user to jump to any place in the script that he/she has previously setup, 4) jump to the last bookmark previously selected, 5) change the active role, and 6) change to another display mode. Once the next group of lines is selected, the script presentation module 104 has as the current position the next individual line to be rendered/presented to the user. This current position is the first line of the next group of lines to render/present.

Once the script presentation module 104 has received an indication from the user that he/she has completed viewing the script 107 the script presentation module 104, at step state 2418, saves the state of the interactive blocking environment 102. This state can include, but is not limited to, the script 107, active role, display mode, and the group of lines the user was viewing. This state can be used the next time the interactive blocking environment 102 is started so that the user does not need to reselect them. The control flow then exits at step 2420.

Figure 25:
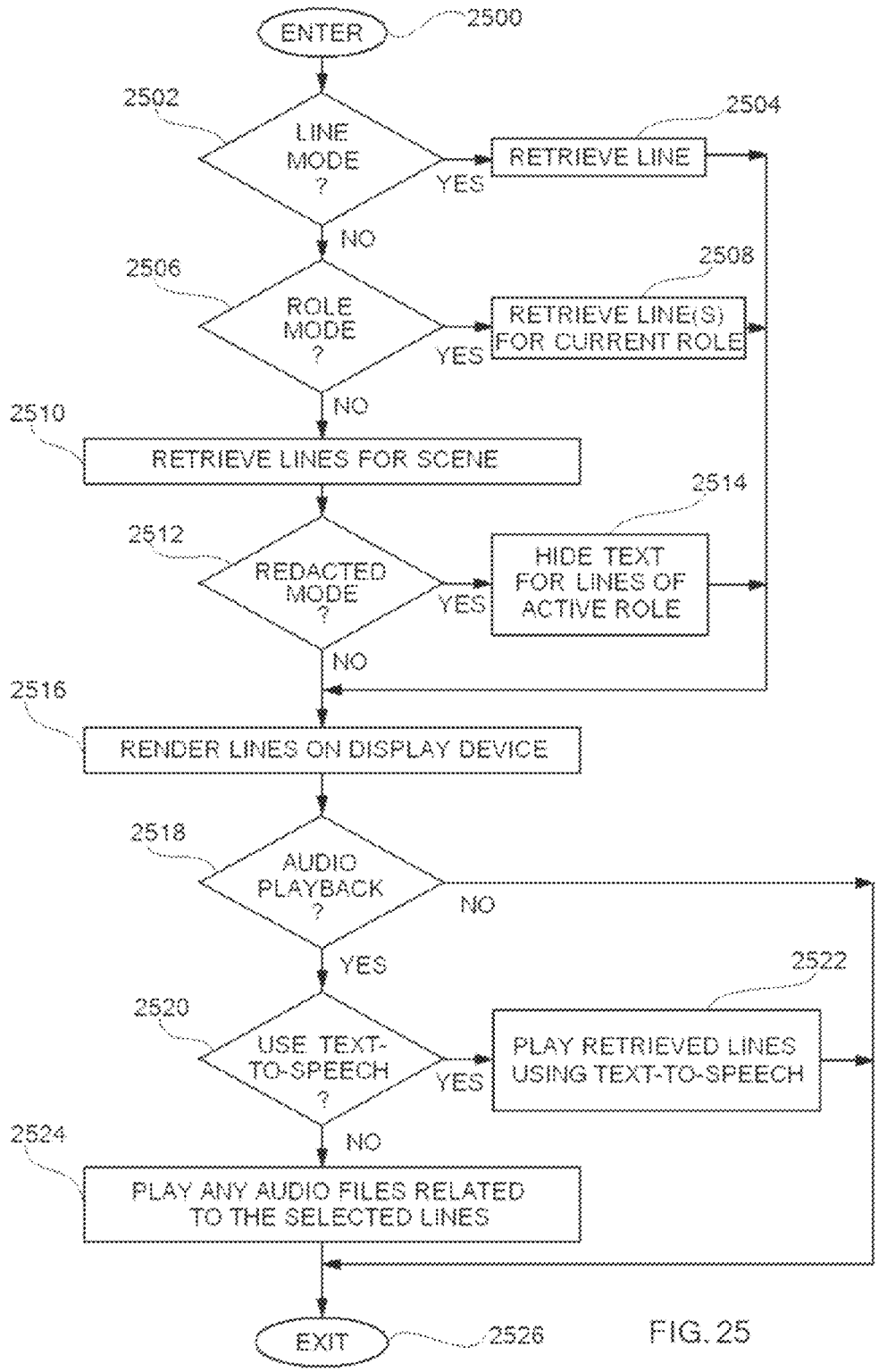
FIG. 25 is an operational flow diagram illustrating one example of a more detailed process for presenting a script to a user within an interactive blocking environment according to one embodiment of the present invention.

FIG. 25 is an operational flow diagram illustrating a more detailed example of the line rendering step 2412 of FIG. 24. The operational flow diagram of FIG. 25 beings at step 2500 and flows directly to step 2502. In rendering/presenting the lines of the script, the script presentation module 104 determines which lines to render/present. Therefore, the script presentation module 104, at step 2502, determines if the user has selected the Line mode. If so, the script presentation module 104, at step 2504, retrieves the line at the current position in the script 107 to be rendered/presented. The control then flows to step 2516. If the determination at step 2504 is negative, the script presentation module 104, at step 2506, determines if the user has selected the Role mode. If so, the script presentation module 104, at step 2508, retrieves the appropriate lines for the current role. If the current position in the script is dialog for the active role, then the line at the current position of the script is retrieved, otherwise, all sequential lines from the current position to the line before the next dialog line for the active role are retrieved. The control then flows to step 2516.

If the result of the determination at step 2506 is negative, the script presentation module 104 determines that either the Scene mode or the Redacted mode has been selected. Therefore, the script presentation module 104, at step 2510, retrieves all lines from the current position in the script 107 up to either, the line before the next Scene line, or the last line in the script 107, whichever comes first. If the script presentation module 104, at step 2512, determines that the user has selected Redacted mode, the script presentation module 104, at step 2514, modifies the lines for the Active role within the just retrieved lines in a manner (such as converting the characters to spaces) that makes the text un-readable. The script presentation manager 104, at step 2516, then renders/presents the retrieved lines to the user via the user interface 108.

The script presentation module 104, at step 2518, determines if the user has selected audio playback of a given set of lines in the script 107. If the user has selected to not use audio playback the control flow then exits at step 2526. The script presentation module 104, at step 2520, determines if the text-to-speech option has been selected. If so, the script presentation module 104, at step 2522, converts the lines just retrieved to audio via the TTS module and audibly presents these lines to the user via the audio interface 110. In one embodiment of the invention, only lines for the non-active role will be played on the audio device. However, any portion of the script 107 can be played. The control flow then exits at step 2526. If TTS has not been selected, the script presentation module 104, at step 2524, plays audio files corresponding to any of the lines in the lines just retrieved. The control flow then exits at step 2526.

Figure 26:
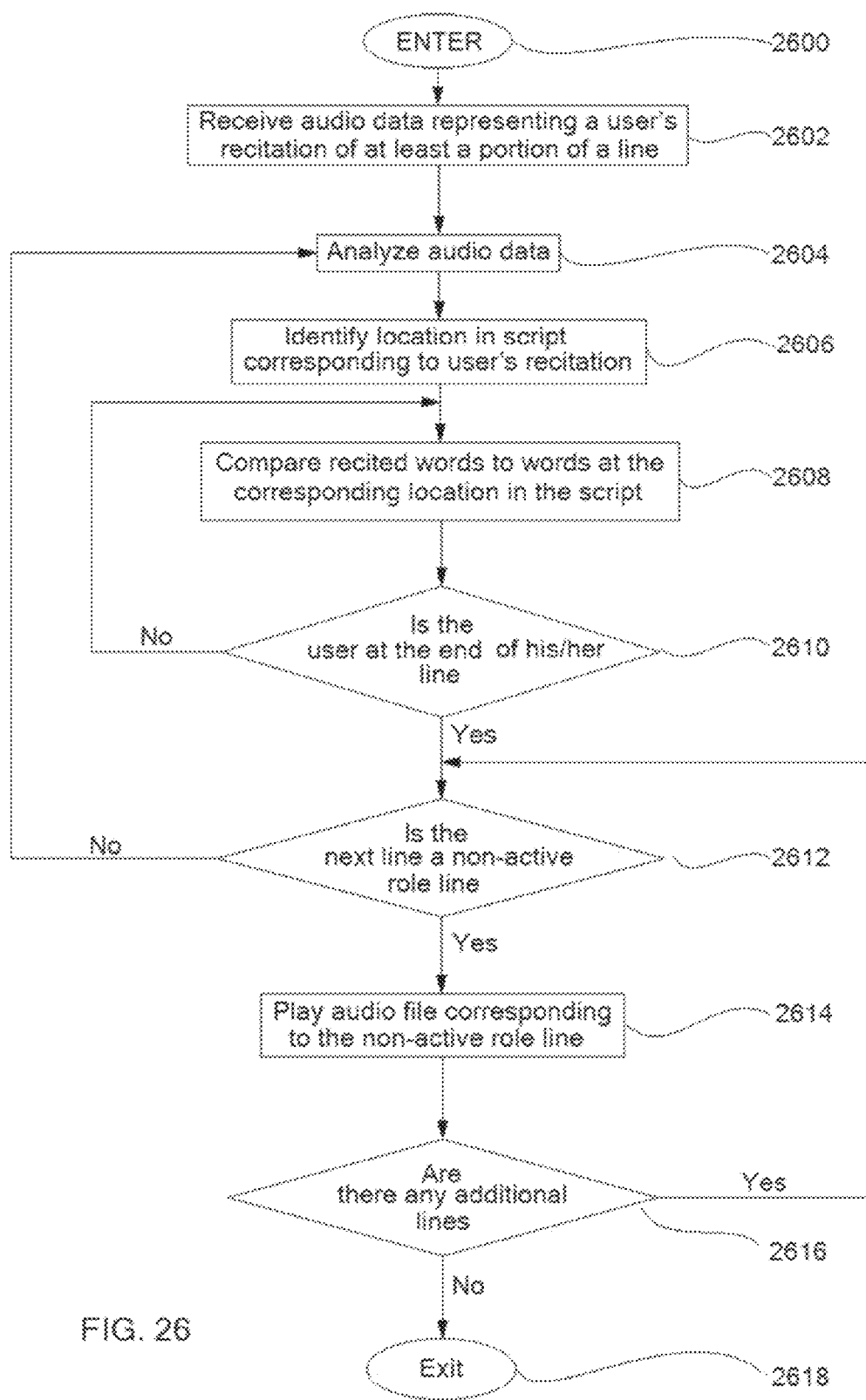
FIG. 26 is an operational flow diagram illustrating one example of a process for providing a simulated reading partner for a script within an interactive blocking environment according to one embodiment of the present invention.

FIG. 26 is an operational flow diagram illustrating another example of providing an interactive blocking environment to a user. The operational flow diagram of FIG. 26 begins at step 2600 and flows directly to step 2604. The script presentation manager 104, at step 2602, receives audio data representing a user's recitation of at least a portion of line in a script 107. For example, the script presentation manager 104 can receive audio through a microphone that is receiving a user's spoken words. The script presentation manager 104, at step 2604, analyzes the audio data. The script presentation manager 104, at step 2606, identifies, based on the analyzing, a location in the script 107 corresponding to the user's recitation.

The script presentation manager 104, at step 2608, compares the words being recited by the user to the words at the identified location in the script 107. The script presentation manager 104, at step 2610, determines, based on the comparison, if the user has reached the end of his/her line. If the result of this determination is negative, the control flow returns to step 2608. If the result of this determination is positive, the script presentation manager 104, at step 2612, determines if the next line in the script 107 is a non-active role line.

If the result of this determination is negative, the script presentation manager 104 continues to analyze the audio data and compare the words recited by the user to words in the corresponding location in the scripts 107. If the result of this determination is positive, the script presentation manager 104, at step 2614, plays an audio file(s) 109 corresponding to the non-active role line and/or renders the line on the screen. The script presentation manager 104, at step 2616, determines if there are any additional lines in the script, scene, etc. If the result of this determination is positive, the control flows to step 2612. If the result of this determination is negative, the control flow exits at step 2618. It should be noted that at the comparison step 2608, the script presentation manager can also determine if the user is correctly or incorrectly reciting his/her lines, as discussed above. Then the script presentation manager 104 is able to notify the user accordingly.

Figure 27:
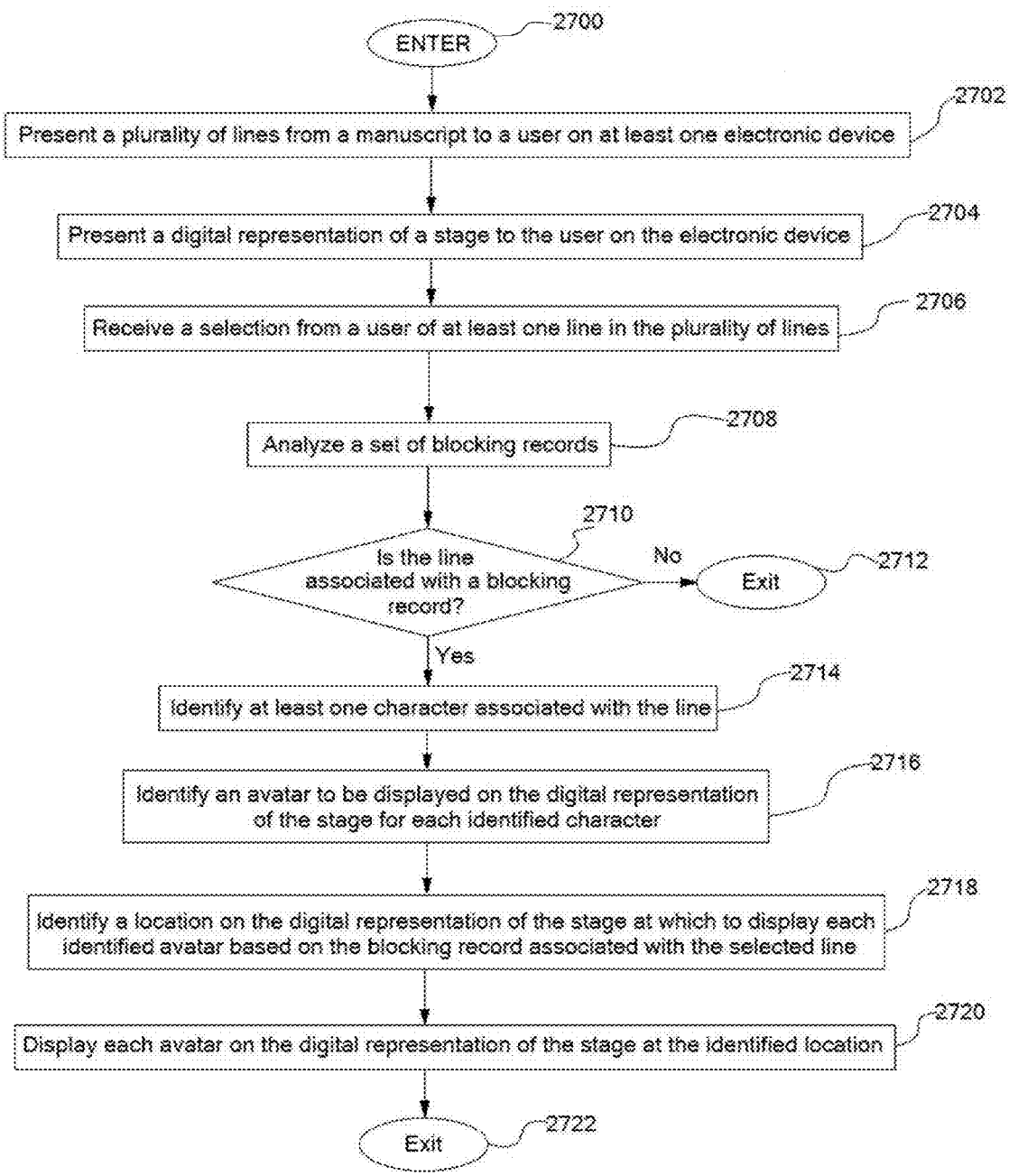
FIG. 27 is an operational flow diagram illustrating one example of a process for providing blocking information within an interactive blocking environment according to one embodiment of the present invention.

FIG. 27 is an operational flow diagram illustrating an example of providing blocking information in an interactive blocking environment to a user. The operational flow diagram of FIG. 27 begins at step 2700 and flows directly to step 2704. The script presentation module 104, at step 2702, presents a plurality of lines 1710 from a manuscript 107 to a user. A blocking module 112, at step 2704, presents a digital representation of a stage 1726 to the user. The blocking module 112, at step 2706, receives a selection from a user of at least one line in the plurality of lines. The blocking module 112, at step 2708, analyzes a set of blocking records 1602 to determine if the selected line is associated with a set of blocking information.

The blocking module 112, at step 2710 determines if the line is associated with a blocking record 1602 based on the analyzing. If the result of this determination is negative, the control flow exits at step 2712. If the result of this determination is positive, the blocking module 112, at step 2714, identifies the character or characters associated with the selected line. The blocking module 112, at step 2716, identifies an avatar to be displayed on the digital representation of the stage 1726 for each of the identified characters. The blocking module 112, at step 2718, identifies a location on the digital representation of the stage 1726 at which to display the identified avatar(s) based on the blocking record 1602 associated with the selected line. The blocking module 112, at step 2720, displays the avatar(s) on the digital representation of the stage 1726 at the identified location. The control flow exits at step 2722.

Information Processing System

Figure 28:
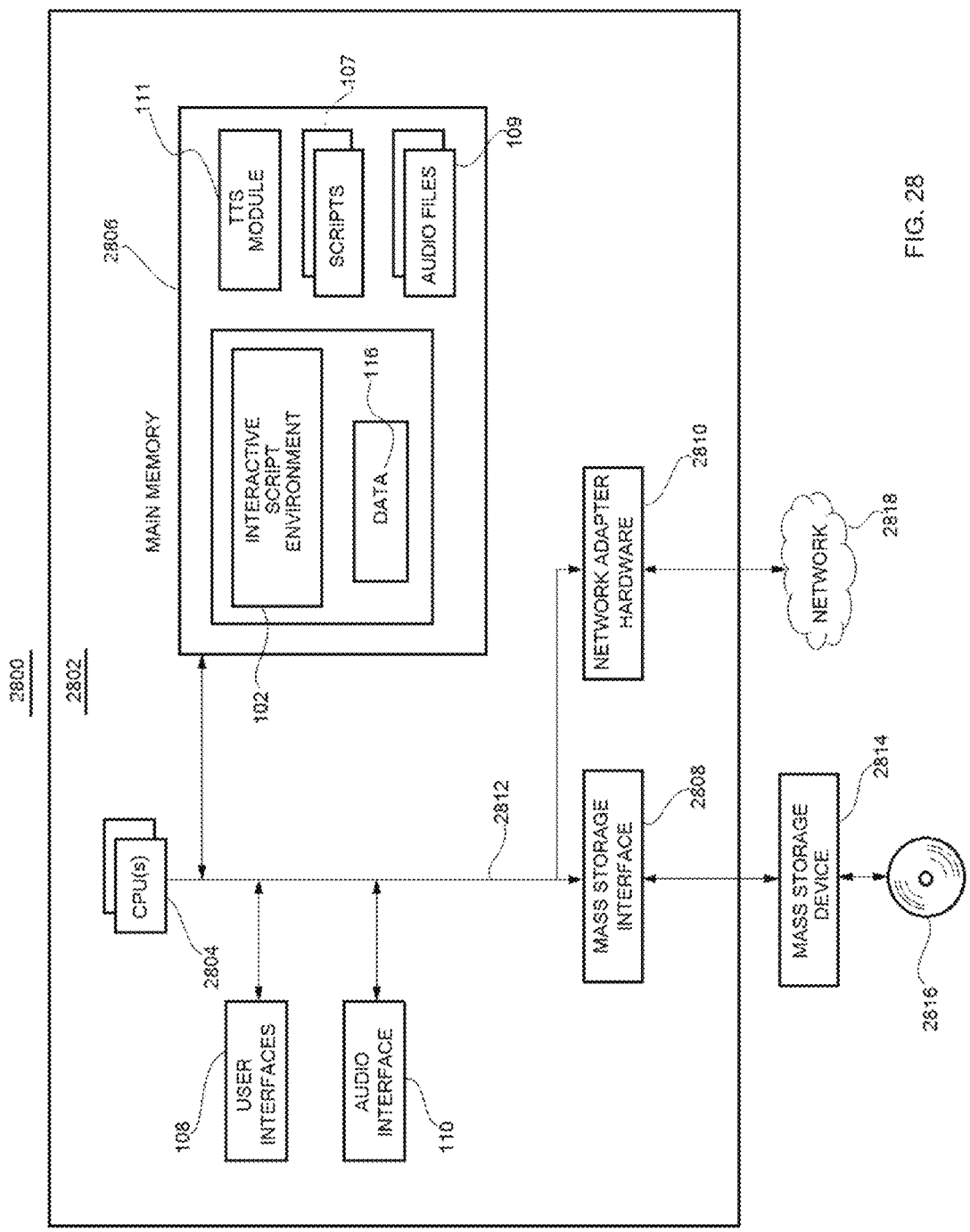
FIG. 28 is a block diagram illustrating a detailed view of an information processing system according to one embodiment of the present invention.

FIG. 28 is a block diagram illustrating a more detailed view of an information processing system 2800, such as the user device 100, which can be utilized in the operating environment discussed above with respect to FIG. 1. It should be noted that if the information processing system 2800 is a wireless communication device, wireless communication subsystems (not shown) can also be included in addition to the components discussed below.

The information processing system 2800, in one embodiment, is based upon a suitably configured processing system adapted to implement one or more embodiments of the present invention. Similarly, any suitably configured processing system can be used as the information processing system 2800 by embodiments of the present invention. The information processing system 2800 includes a computer 2802. The computer 2802 has a processor(s) 2804 that is connected to a main memory 2806, mass storage interface 2808, and network adapter hardware 2810. A system bus 2812 interconnects these system components. The main memory 2806, in one embodiment, comprises the interactive blocking environment 102 and its components as shown in FIG. 1, the scripts 107, audio files 109, TTS module 111, and script/blocking data 116.

Although illustrated as concurrently resident in the main memory 2806, it is clear that respective components of the main memory 2806 are not required to be completely resident in the main memory 2806 at all times or even at the same time. In one embodiment, the information processing system 2800 utilizes conventional virtual addressing mechanisms to allow programs to behave as if they have access to a large, single storage entity, referred to herein as a computer system memory, instead of access to multiple, smaller storage entities such as the main memory 2806 and data storage device 2816. Note that the term "computer system memory" is used herein to generically refer to the entire virtual memory of the information processing system 2800.

The mass storage interface 2808 is used to connect mass storage devices, such as mass storage device 2814, to the information processing system 2800. One specific type of data storage device is an optical drive such as a CD/DVD drive, which may be used to store data to and read data from a computer readable medium or storage product such as (but not limited to) a CD/DVD 2816. Another type of data storage device is a data storage device configured to support, for example, NTFS type file system operations.

Although only one CPU 2804 is illustrated for computer 2802, computer systems with multiple CPUs can be used equally effectively. Embodiments of the present invention further incorporate interfaces that each includes separate, fully programmed microprocessors that are used to off-load processing from the CPU 2804. An operating system (not shown) included in the main memory is any suitable operating system such as, but not limited to, any of the Linux, UNIX, Windows, and Windows Server based operating systems. Handheld operating systems such as, but not limited to, iOS, Android, webOS, etc., are also applicable as well. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 2800. The network adapter hardware 2810 is used to provide an interface to a network 2818. Embodiments of the present invention are able to be adapted to work with any data communications connections including present day analog and/or digital techniques or via a future networking mechanism.

Although the exemplary embodiments of the present invention are described in the context of a fully functional computer system, those of ordinary skill in the art will appreciate that various embodiments are capable of being distributed as a program product via CD or DVD, e.g. CD 2816, CD ROM, or other form of recordable media, or via any type of electronic transmission mechanism.

Doubling Up

The inventor has discovered identifying the lines in a text is associated with a character, allows for quick mapping of "character doubling." The term "character doubling" or "dual role" means a single actor or performer that plays two or more parts, typically at different times, in a script. This is very common in certain productions such as William Shakespeare productions. One example is where one actor plays both of the characters of Cordelia and the Fool in King Lear. Another example is in stage productions of Peter Pan, it is a tradition for Mr. Darling and Captain Hook to be played by the same actor.

Turning now to FIG. 31, shown is a table 3100 of generated to enable a user to identify one or characters that may be played by the same person, such as doubling or actors, according to one embodiment of the present invention. Shown are four characters 3102 "Character 1", "Character 2", "Character 3" and "Character 4". Two acts of this play are shown as "Act I" 3104 and "Act II "3106". Act I is further divided into three scenes "Scene 1" 3142, "Scene 2" 3144, and "Scene 3" 3146 as shown. In this example Act II is divided into two scenes of "Scene 1" 3152 and "Scene 2" 3154 as shown. By examining which lines either dialogue or stage directions are associated with each character, it is easy to map when portions of the script when one actor may double up. Here a sequential series of identification numbers (e.g. 1, 2, 3, etc.) are associated with a sequential series of lines of text. One or more characters that have dialog or stage directions for a given line or series of lines of text is presented or displayed as shown. Character 3 has zero lines of dialog or stage directions in Scene 1 of Act 1 but has many lines in the range of 91-2155 of dialog and/or stage directions in Scene 1 Act 2.

Using this map, it would be difficult for any actor playing the Characters 1-4 in the first scene to double up since the lines are overlapping i.e. lines 1-93 for Character 1 and Character 2 overlap with lines 74-93, so the same actor cannot play any combination of Characters 1 and Character 2 and Character 3. However it is easy to see that the same actor may be able to double up and play both Character 1 and Character 3 since they do not recite lines at the same time.

This table 3100 greatly assists planning a production. The production staff can identify opportunities to have the same actor double up roles for one or more characters. It is important to note, that other types of presentation may be used with or in addition to a table. Other types of presentations include bar graphs that plot each character speaking during a line or group of lines. Further, the lines may not be consecutive through the entire script. For example, the script lines may restart for each scene or act rather than run consecutively as shown.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Aspects of the present invention were discussed above with reference to flowchart illustrations and/or block diagrams of methods, apparatus (systems), and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various example embodiments of the present invention have been discussed in the context of a fully functional computer system, those of ordinary skill in the art will appreciate that various embodiments can be embodied as a system, method, or computer program product and are capable of being distributed as a computer readable storage medium or a program product via CD or DVD, e.g. CD, CD-ROM, or other form of recordable media, and/or according to alternative embodiments via any type of electronic transmission mechanism. A computer program product can be embodied in one or more computer readable medium(s) having computer readable program code embodied thereon. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system."

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

What is claimed is:

1. A method for presenting positional information of an object associated with a text, the method comprising:
  performing iteratively for each selected group of one or more lines of a text
  a) displaying in a first region of a user interface on an electronic device, one or more lines of a text, each of the one or more lines of the text including at least one of role names, dialogue, and stage directions;

b) displaying in a second region of the user interface of the electronic device, an image of a venue associated with the one or more lines of the text, the first region being displayed simultaneously to the second region;

c) receiving from a user, the user interface of the electronic device, using an input device, selection of at least one digital representation of an object to relocate the object from a first position to a second position within the image of the venue associated with a selected group of the one or more lines of the text;

d) determining, by a processor, at least an x-position and y-position of the digital representation of the object that has been relocated within the image of the venue;

e) storing a position of the digital representation of the object within the image of the venue into a positional information record, the positional information record including:
   an identifier, associated with the selected group of one or more lines of the text,
   an identifier associated with the digital representation of the object within the image of the venue, and
   the x-position and y-position of the digital representation of the object within the image of the venue;

f) updating the display of the second region for the digital representation of the object at the x-position and y-position within the image of the venue, using information stored in the positional information record associated with the selected group of the one or more lines of the text, wherein the updating of the display comprises providing an animation of the object from a previous position to the relocated position for the selected group of the one or more lines of the text based on a relationship stored in the positional information record comprising a transition between multiple positions of the object in the venue with respect to a plurality of lines of a text, as a subsequent selected group of lines is displayed; and g) repeating steps a through f above for a next selected group of one or more lines of the text.

2. The method of claim 1, wherein the object represents one of an actor, a dancer, a marching band participant, or a combination thereof.

3. The method of claim 1, wherein the object represents a prop.

4. The method of claim 1, wherein the text is one of a play, a television show, a movie, a musical, musical score, or a combination thereof.

5. The method of claim 1, wherein the venue is one of a stage, an arena, a field, a stadium, or a combination thereof.

6. The method of claim 1, further comprising:
associating with the one or more lines of the text a cue record for at least one of lighting changes and sound generation; and
wherein the updating the display of the second region includes displaying information in the cue record.

7. The method of claim 1, further comprising:
receiving from the user, using the user interface of the electronic device, a selection of a performer perspective in which the image of the venue is to be presented from a perspective of a performer or a perspective on an audience; and
wherein the updating the display of the second region includes displaying the image of the venue in the perspective that has been selected.

8. The method of claim 1, wherein the updating the display of the second region includes displaying the digital representation of the object along with a path indicator between a plurality of x-positions and y-positions for the digital representation of the object to move in association with the one or more lines of the text.

9. The method of claim 8, wherein the path indicator is a line between a plurality of x-positions and y-positions.

10. The method of claim 8, wherein the path indicator includes a sequence indicator associated with the digital representation of the object to move.

11. The method of claim 1, wherein the object represents one of an actor, a dancer, a marching band participant, or a combination thereof and wherein the text is one of a play, a television show, a movie, a musical, musical score, or a combination thereof, and the method further comprising:
associating a sequential series of identification numbers with a sequential series of lines of the text;
determining a set of one or more characters associated with at least a subset of the sequential series of lines of the text; and
displaying at least one character in the set of one or more characters with at least the subset sequential series of numbers to enable a user to identify one or characters that may be played by one person.

12. An information processing system for presenting positional information of an object associated with text, the information processing comprising:
a memory;
a processor communicatively coupled to the memory; and
an interactive blocking environment communicatively coupled to the memory and the processor, wherein the interactive blocking environment is configured to perform a method comprising:
performing iteratively for each selected group of one or more lines of a text
   a) displaying in a first region of a user interface on an electronic device, one or more lines of a text, each of the one or more lines of the text including at least one of role names, dialogue, and stage directions;
   b) displaying in a second region of the user interface of the electronic device, an image of a venue associated with the one or more lines of the text, the first region being displayed simultaneously to the second region;
   c) receiving from a user, the user interface of the electronic device, using an input device, selection of at least one digital representation of an object to relocate the object from a first position to a second position within the image of the venue associated with a selected group of the one or more lines of the text;
   d) determining, by a processor, at least an x-position and y-position of the digital representation of the object that has been relocated within the image of the venue;
   e) storing a position of the digital representation of the object within the image of the venue into a positional information record, the positional information record including:
      an identifier, associated with the selected group of one or more lines of the text,
      an identifier associated with the digital representation of the object within the image of the venue, and
      the x-position and y-position of the digital representation of the object within the image of the venue;
   f) updating the display of the second region for the digital representation of the object at the x-position and y-position within the image of the venue, using information stored in the positional information record associated with the selected group of the one or more lines of the text, wherein the updating of the display comprises providing an animation of the object from a previous position to the relocated position for the selected group of the one or more lines of the text based on a relationship stored in the positional information record comprising a transition between multiple positions of the object in the venue with respect to a plurality of lines of a text, as a subsequent selected group of lines is displayed; and g) repeating steps a through f above for a next selected group of one or more lines of the text.

13. The information processing system of claim 11, wherein the object represents one of an actor, a dancer, a marching band participant, or a combination thereof.

14. The information processing system of claim 11, wherein the object represents a prop.

15. The information processing system of claim 11, wherein the text is one of a play, a television show, a movie, a musical, musical score, or a combination thereof.

16. The information processing system of claim 11, wherein the venue is one of a stage, an arena, a field, a stadium, or a combination thereof.

17. The information processing system of claim 11, further comprising:

associating with the one or more lines of the text a cue record for at least one of lighting changes and sound generation; and wherein the updating the display of the second region includes displaying information in the cue record.

18. The information processing system of claim 11, further comprising:

receiving from the user, using the user interface of the electronic device, a selection of a performer perspective in which the image of the venue is to be presented from a perspective of a performer or a perspective on an audience; and wherein the updating the display of the second region includes displaying the image of the venue in the perspective that has been selected.

19. The information processing system of claim 11, wherein the updating the display of the second region includes displaying the digital representation of the object along with a path indicator between a plurality of x-positions and y-positions for the digital representation of the object to move in association with the one or more lines of the text.

20. A computer program product for presenting positional information associated with a manuscript to a user, the computer program product comprising:

a non-transitory storage medium readable by a processing circuit and storing instructions for execution by the processing circuit for performing a method comprising:

performing iteratively for each selected group of one or more lines of a text a) displaying in a first region of a user interface on an electronic device, one or more lines of a text, each of the one or more lines of the text including at least one of role names, dialogue, and stage directions;

b) displaying in a second region of the user interface of the electronic device, an image of a venue associated with the one or more lines of the text, the first region being displayed simultaneously to the second region;

c) receiving from a user, the user interface of the electronic device, using an input device, selection of at least one digital representation of an object to relocate the object from a first position to a second position within the image of the venue associated with a selected group of the one or more lines of the text;

d) determining, by a processor, at least an x-position and y-position of the digital representation of the object that has been relocated within the image of the venue;

e) storing a position of the digital representation of the object within the image of the venue into a positional information record, the positional information record including:

an identifier, associated with the selected group of one or more lines of the text, an identifier associated with the digital representation of the object within the image of the venue, and the x-position and y-position of the digital representation of the object within the image of the venue;

f) updating the display of the second region for the digital representation of the object at the x-position and y-position within the image of the venue, using information stored in the positional information record associated with the selected group of the one or more lines of the text, wherein the updating of the display comprises providing an animation of the object from a previous position to the relocated position for the selected group of the one or more lines of the text based on a relationship stored in the positional information record comprising a transition between multiple positions of the object in the venue with respect to a plurality of lines of a text, as a subsequent selected group of lines is displayed; and g) repeating steps a through f above for a next selected group of one or more lines of the text.

\* \* \* \* \*